United States Patent
Lee et al.

(10) Patent No.: US 9,448,589 B2
(45) Date of Patent: Sep. 20, 2016

(54) MOBILE TERMINAL AND CONTROL METHOD THEREOF

(71) Applicant: LG ELECTRONICS INC., Seoul (KR)

(72) Inventors: Seoyeon Lee, Seoul (KR); Soohyun Lee, Seoul (KR); Yong Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 144 days.

(21) Appl. No.: 14/104,592

(22) Filed: Dec. 12, 2013

(65) Prior Publication Data
US 2014/0189554 A1   Jul. 3, 2014

(30) Foreign Application Priority Data

Dec. 31, 2012  (KR) .................. 10-2012-0158038

(51) Int. Cl.
  *G06F 3/048*  (2013.01)
  *G06F 1/16*   (2006.01)
  *G06F 3/0488* (2013.01)

(52) U.S. Cl.
  CPC ......... *G06F 1/1626* (2013.01); *G06F 3/04883* (2013.01); *H04M 2250/70* (2013.01)

(58) Field of Classification Search
  CPC ............ G06F 1/1626; G06F 3/04883; H04M 2250/70
  USPC ........................................... 715/765
  See application file for complete search history.

(56) References Cited

U.S. PATENT DOCUMENTS

| 5,778,404 | A | 7/1998 | Capps et al. | |
|---|---|---|---|---|
| 6,016,502 | A | 1/2000 | Haneda et al. | |
| 6,356,287 | B1* | 3/2002 | Ruberry et al. | 715/864 |
| 8,826,169 | B1* | 9/2014 | Yacoub et al. | 715/776 |
| 2009/0044139 | A1 | 2/2009 | Shin et al. | |
| 2011/0141031 | A1* | 6/2011 | McCullough et al. | 345/173 |
| 2011/0320978 | A1 | 12/2011 | Horodezky et al. | |
| 2012/0192093 | A1* | 7/2012 | Migos et al. | 715/773 |
| 2012/0216113 | A1 | 8/2012 | Li | |
| 2012/0287061 | A1 | 11/2012 | Yang | |
| 2013/0002719 | A1* | 1/2013 | Ide | 345/660 |
| 2014/0055427 | A1* | 2/2014 | Kim et al. | 345/179 |
| 2014/0109019 | A1* | 4/2014 | Rana et al. | 715/863 |
| 2015/0186349 | A1* | 7/2015 | Hicks et al. | 715/232 |
| 2015/0186351 | A1* | 7/2015 | Hicks et al. | 715/233 |

FOREIGN PATENT DOCUMENTS

| CN | 1151553 A | 6/1997 |
|---|---|---|
| CN | 102141886 A | 8/2011 |
| CN | 102419683 A | 4/2012 |
| CN | 102419683 A | 12/2012 |
| CN | 102841737 A | 12/2012 |

* cited by examiner

*Primary Examiner* — David Phantana Angkool
(74) *Attorney, Agent, or Firm* — Birch, Stewart, Kolasch & Birch, LLP

(57) ABSTRACT

A mobile terminal and a control method thereof are disclosed. The mobile terminal includes a touchscreen, and a controller configured, upon reception of a predetermined touch input applied to the touchscreen, to display an object for controlling deletion of a text disposed around a touch point corresponding to the touch input at the touch point, to display a control area including a plurality of control items for setting a deletion direction and a deletion unit based on the object on the touchscreen, and to delete the text based on at least one control item upon selection of the at least one control item. Accordingly, it is possible to provide a user interface accessible more rapidly and easily when a text displayed on the touchscreen is deleted.

13 Claims, 24 Drawing Sheets

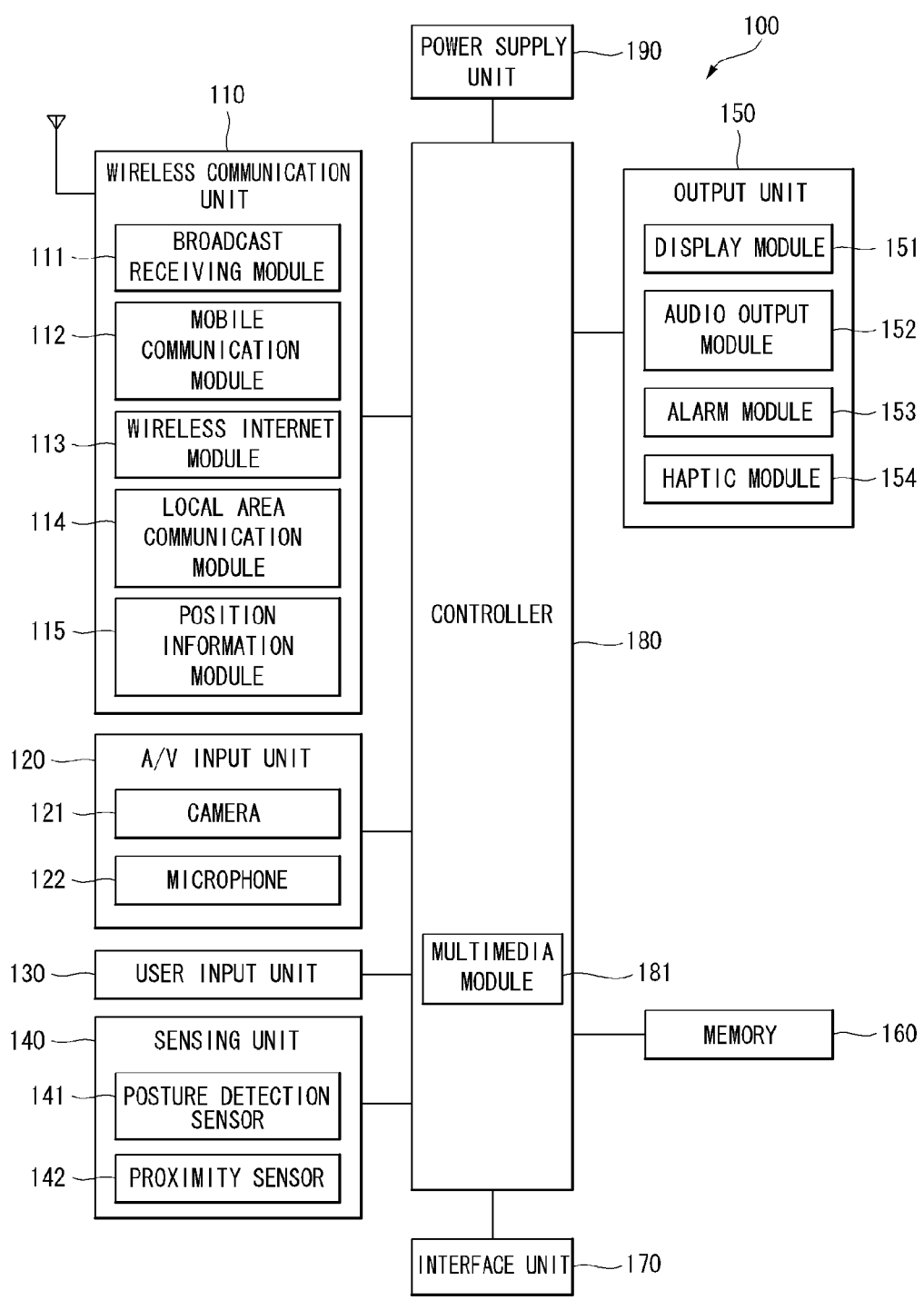

FIG. 8
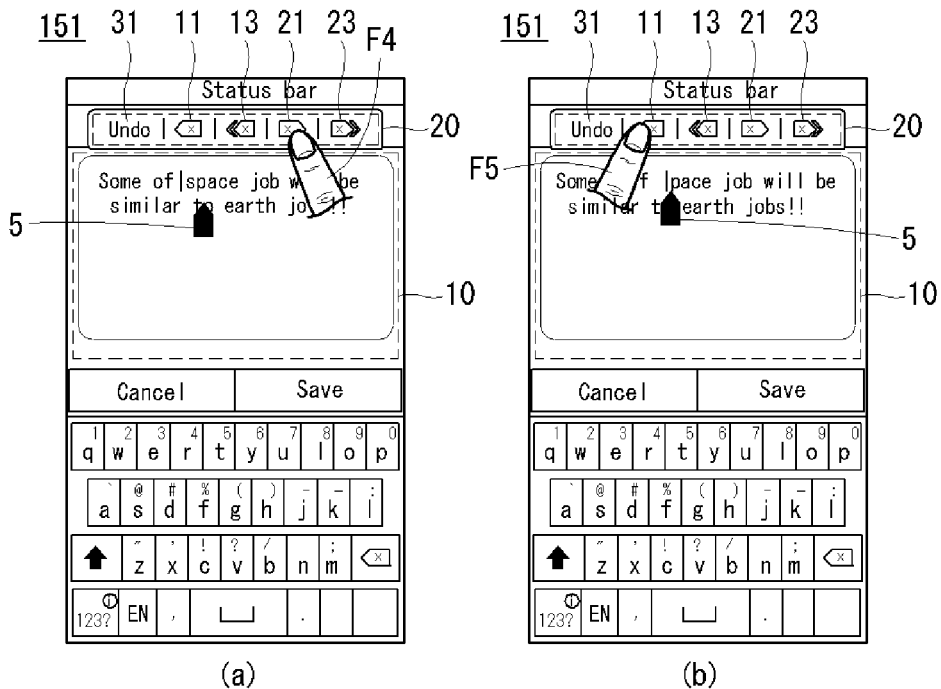
(a)          (b)
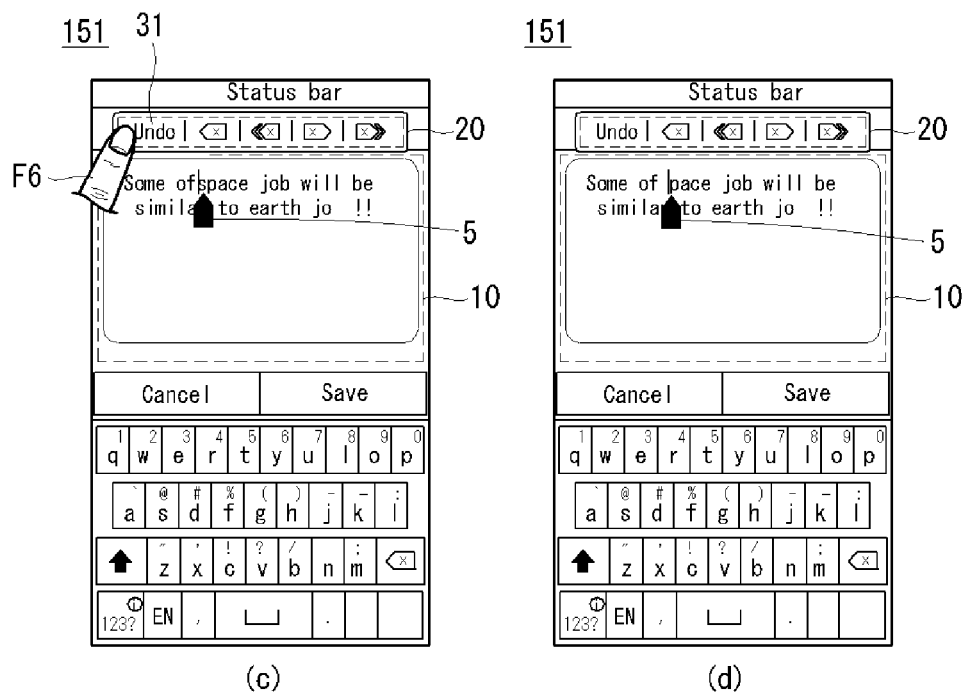
(c)          (d)

FIG. 10
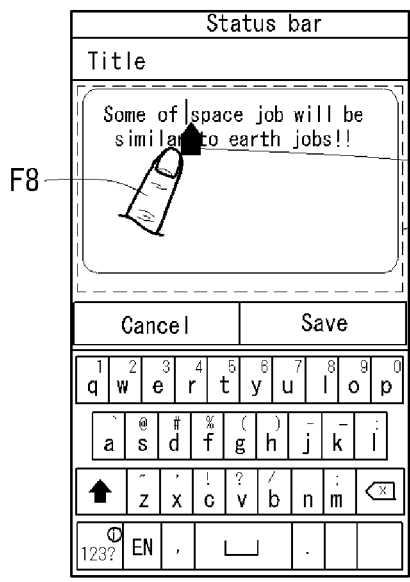
(a)
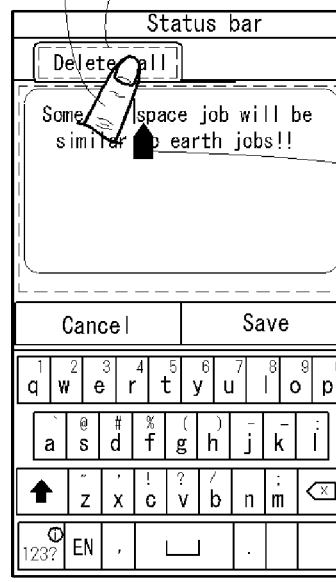
(b)
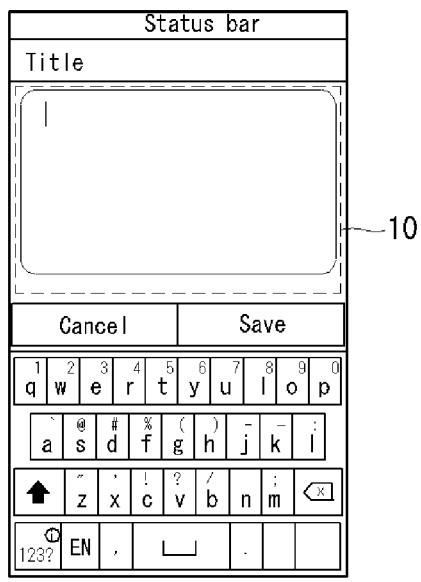
(c)

FIG. 20
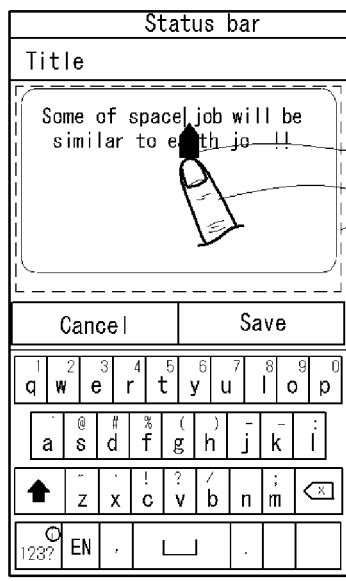
(a)
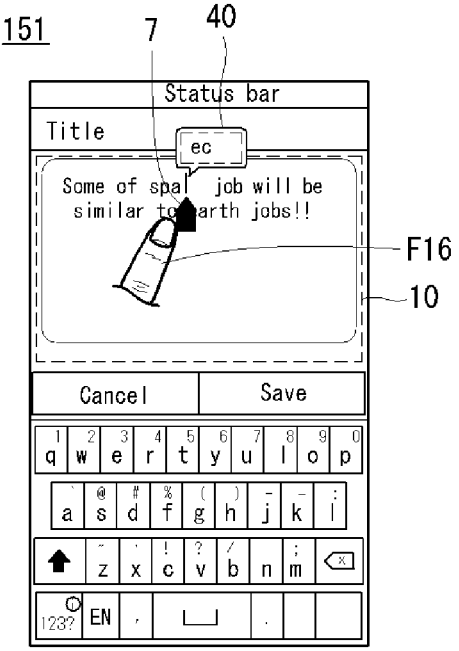
(b)
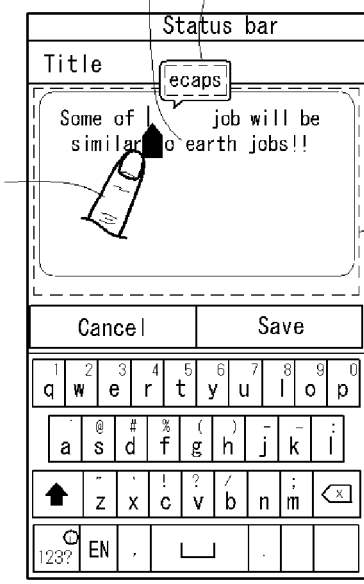
(c)
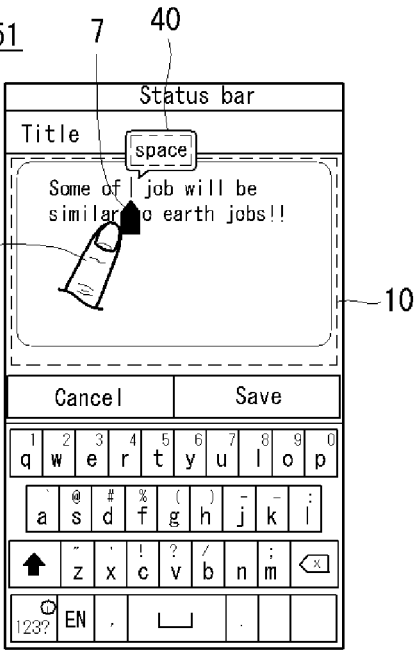
(d)

FIG. 21
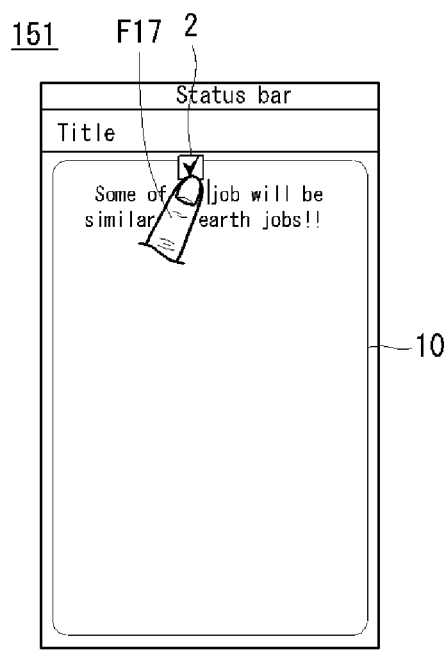
(a)
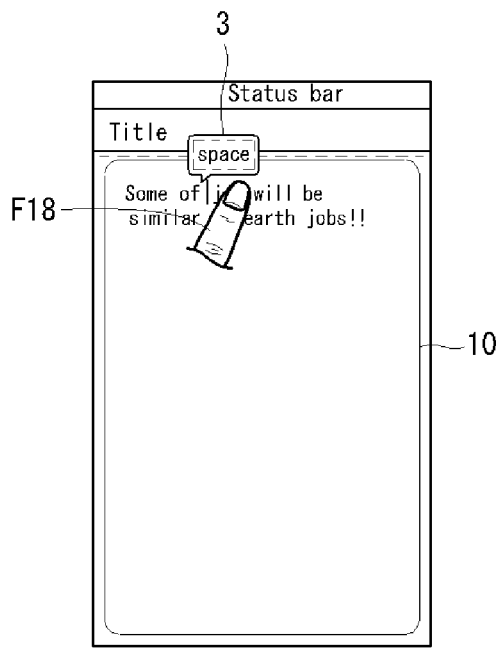
(b)
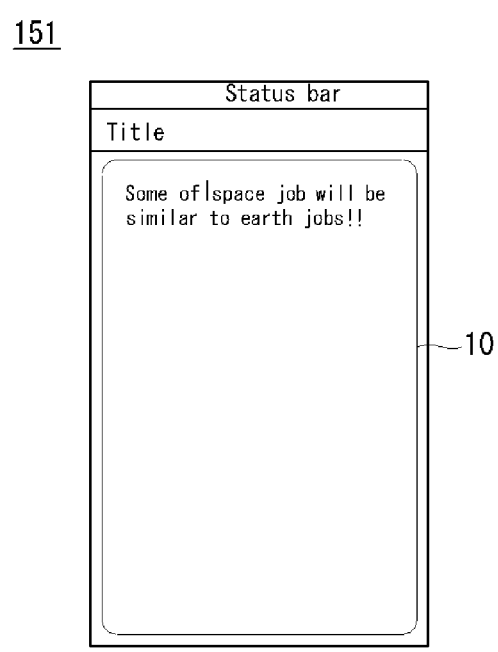
(c)

MOBILE TERMINAL AND CONTROL METHOD THEREOF

CROSS-REFERENCE TO RELATED APPLICATIONS

Pursuant to 35 U.S.C. §119(a), this application claims the benefit of earlier filing date and right of priority to Korean Patent Application No. 10-2012-0158038, filed on 31 Dec., 2012, the contents of which are incorporated by reference herein in their entirety.

BACKGROUND OF THE INVENTION

1. Field of the Invention

The present invention relates to a mobile terminal and a control method thereof, and more particularly, to a mobile terminal and a control method thereof to provide a user interface that can be accessed more rapidly and easily when a text displayed on a touchscreen is deleted.

2. Discussion of the Related Art

As functions of terminals such as personal computers, laptop computers, cellular phones diversify, the terminals become multimedia players having multiple functions for capturing pictures or moving images, playing music, moving image files and games and receiving broadcasting programs.

Terminals can be categorized as mobile terminals and stationary terminals. The mobile terminals can be further comprised of handheld terminals and vehicle mount terminals according to whether users can personally carry the terminals. Conventional terminals including mobile terminals provide an increasing number of complex and various functions.

To support and enhance the increasing number of functions in a terminal, improving a structural part and/or a software part of the terminal would be desirable.

SUMMARY OF THE INVENTION

Accordingly, the present invention is directed to a mobile terminal and a control method thereof to provide a user interface that can be accessed more rapidly and easily when a text displayed on a touchscreen is deleted that substantially obviates one or more problems due to limitations and disadvantages of the related art.

It is to be understood that both the foregoing general description and the following detailed description of the present invention are exemplary and explanatory and are intended to provide further explanation of the invention as claimed.

The mobile terminal and control method thereof according to the present invention have the following advantages.

According to the present invention, it is possible to rapidly and easily access a user interface for deleting a text displayed on a touchscreen.

A mobile terminal comprises a touchscreen; and a controller configured, upon reception of a predetermined touch input applied to the touchscreen, to display an object for controlling deletion of a text disposed around a touch point corresponding to the touch input at the touch point, to display a control area including a plurality of control items for setting a deletion direction and a deletion unit based on the object on the touchscreen, and to delete the text based on at least one control item upon selection of the at least one control item.

The deletion direction includes at least one of the left and right of the object and the deletion unit includes at least one of a letter, a word and a sentence.

The controller displays an area in which a list of deleted texts is displayed on the touchscreen.

Upon reception of a touch input for selecting at least one text from the list of deleted texts, the controller recovers the selected text and displays the recovered text at a position where the selected text was disposed before deleted.

The controller displays an indicator at a position where the deleted text was disposed before deleted.

The controller displays the deleted text in place of the indicator upon reception of a touch input for selecting the indicator.

The controller displays the deleted text at a position where the deleted text was disposed before deleted upon reception of a touch input for selecting the deleted text displayed in place of the indicator.

A mobile terminal comprises a touchscreen; and a controller configured, upon reception of a predetermined first touch input applied to the touchscreen, to display an object for controlling deletion of a text disposed around a touch point corresponding to the first touch input at the touch point, to control the mobile terminal to enter a text deletion mode upon reception of a second touch input applied to the object, and to maintain the text deletion mode while the second touch input is maintained.

In the text deletion mode, upon reception of a drag input applied to the object the controller displays a range in which the drag input is applied as a block, and the controller deletes a text included in the block upon cancellation of the drag input.

In the text deletion mode, upon reception of a drag input applied to the object in a first direction the controller deletes a text included within a range in which the drag input is applied, and the controller displays the deleted text upon reception of a drag input in a second direction opposite to the first direction.

A method of controlling a mobile terminal comprises receiving a predetermined touch input applied to a touchscreen; displaying an object for controlling deletion of a text disposed around a touch point corresponding to the touch input at the touch point; displaying a control area including a plurality of control items for setting a deletion direction and a deletion unit based on the object on the touchscreen; and deleting the text based on at least one control item upon selection of the at least one control item.

The method of controlling a mobile terminal comprises displaying an area in which a list of deleted texts is displayed on the touchscreen.

The method of controlling a mobile terminal comprises, upon reception of a touch input for selecting at least one text from the list of deleted texts, recovering the selected text and displaying the text at a position where the text was disposed before deleted.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 is a block diagram of a mobile terminal according to an embodiment;

FIGS. 6 to 10 illustrate the first embodiment of the present invention;

FIGS. 19, 20 and 21 illustrate the example of recovering a deleted text.

DETAILED DESCRIPTION OF THE INVENTION

Figure 2A:
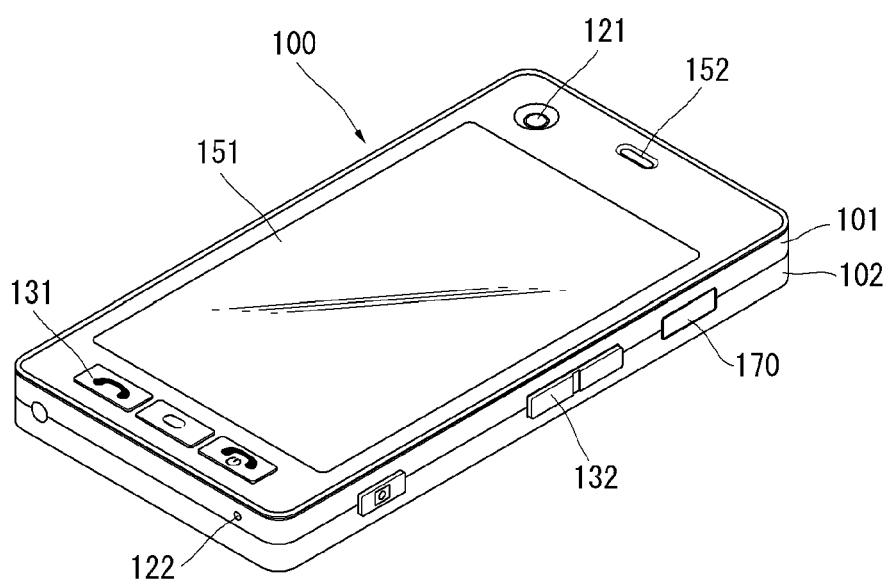
FIG. 2A is a front perspective view of the mobile terminal according to an embodiment.

Arrangements and embodiments may now be described more fully with reference to the accompanying drawings, in which exemplary embodiments may be shown. Embodiments may, however, be embodied in many different forms and should not be construed as being limited to embodiments set forth herein; rather, embodiments may be provided so that this disclosure will be thorough and complete, and will fully convey the concept to those skilled in the art.

A mobile terminal may be described below with reference to the accompanying drawings. In the following description, suffixes "module" and "unit" may be given to components of the mobile terminal in consideration of only facilitation of description and do not have meanings or functions discriminated from each other.

The mobile terminal may include a cellular phone, a smart phone, a laptop computer, a digital broadcasting terminal, personal digital assistants (PDA), a portable multimedia player (PMP), a navigation system and/or so on.

FIG. 1 is a block diagram of a mobile terminal according to an embodiment. Other embodiments, configurations and arrangements may also be provided.

As shown, the mobile terminal 100 may include a wireless communication unit 110 (or radio communication unit), an audio/video (A/V) input unit 120, a user input unit 130, a sensing unit 140, an output unit 150, a memory 160, an interface 170, a controller 180, and a power supply 190. The components shown in FIG. 1 may be essential parts and/or a number of components included in the mobile terminal 100 may vary. Components of the mobile terminal 100 may now be described.

The wireless communication unit 110 may include at least one module that enables radio communication between the mobile terminal 100 and a radio communication system or between the mobile terminal 100 and a network in which the mobile terminal 100 is located. For example, the wireless communication unit 110 may include a broadcasting receiving module 111, a mobile communication module 112, a wireless Internet module 113, a short range communication module 114 (or local area communication module), and a location information module 115 (or position information module).

The broadcasting receiving module 111 may receive broadcasting signals and/or broadcasting related information from an external broadcasting management server through a broadcasting channel. The broadcasting channel may include a satellite channel and a terrestrial channel, and the broadcasting management server may be a server that generates and transmits broadcasting signals and/or broadcasting related information or a server that receives previously created broadcasting signals and/or broadcasting related information and transmits the broadcasting signals and/or broadcasting related information to a terminal.

The broadcasting signals may include not only TV broadcasting signals, radio broadcasting signals, and data broadcasting signals but also signals in the form of a combination of a TV broadcasting signal and a radio broadcasting signal. The broadcasting related information may be information on a broadcasting channel, a broadcasting program or a broadcasting service provider, and may be provided even through a mobile communication network. In the latter case, the broadcasting related information may be received by the mobile communication module 112.

The broadcasting related information may exist in various forms. For example, the broadcasting related information may exist in the form of an electronic program guide (EPG) of a digital multimedia broadcasting (DMB) system or in the form of an electronic service guide (ESG) of a digital video broadcast-handheld (DVB-H) system.

The broadcasting receiving module 111 may receive broadcasting signals using various broadcasting systems. More particularly, the broadcasting receiving module 111 may receive digital broadcasting signals using digital broadcasting systems such as a digital multimedia broadcasting-terrestrial (DMB-T) system, a digital multimedia broadcasting-satellite (DMB-S) system, a media forward link only (MediaFLO) system, a DVB-H and integrated services digital broadcast-terrestrial (ISDB-T) systems. The broadcasting receiving module 111 may receive signals from broadcasting systems providing broadcasting signals other than the above-described digital broadcasting systems.

The broadcasting signals and/or broadcasting related information received through the broadcasting receiving module 111 may be stored in the memory 160. The mobile communication module 112 may transmit/receive a radio signal to/from at least one of a base station, an external terminal and a server on a, mobile communication network. The radio signal may include a voice call signal, a video telephony call signal or data in various forms according to transmission and reception of text/multimedia messages.

The wireless Internet module 113 may correspond to a module for wireless Internet access and may be included in the mobile terminal 100 or may be externally attached to the mobile terminal 100. Wireless LAN (WLAN or Wi-Fi), wireless broadband (Wibro), world interoperability for microwave access (Wimax), high speed downlink packet access (HSDPA) and so on may be used as a wireless Internet technique.

The short range communication module 114 may correspond to a module for short range communication. Further, Bluetooth®, radio frequency identification (RFID), infrared data association (IrDA), ultra wideband (UWB) and/or Zig-Bee® may be used as a short range communication technique.

The location information module 115 may confirm or obtain a location or a position of the mobile terminal 100. The location information module 115 may obtain position information by using a global navigation satellite system (GNSS). The GNSS is a terminology describing a radio navigation satellite system that revolves around the earth and transmits reference signals to predetermined types of radio navigation receivers such that the radio navigation receivers can determine their positions on the earth's surface or near the earth's surface. The GNSS may include a global positioning system (GPS) of the United States, Galileo of Europe, a global orbiting navigational satellite system (GLONASS) of Russia, COMPASS of China, and a quasi-zenith satellite system (QZSS) of Japan, for example.

A global positioning system (GPS) module is a representative example of the location information module 115. The GPS module may calculate information on distances between one point or object and at least three satellites and information on a time when distance information is measured and apply trigonometry to the obtained distance information to obtain three-dimensional position information on the point or object according to latitude, longitude and altitude at a predetermined time.

A method of calculating position and time information using three satellites and correcting the calculated position and time information using another satellite may also be used. Additionally, the GPS module may continuously calculate a current position in real time and calculate velocity information using the location or position information.

The A/V input unit 120 may input (or receive) an audio signal and/or a video signal. The A/V input unit 120 may include a camera 121 and a microphone 122. The camera 121 may process image frames of still images or moving images obtained by an image sensor in a video telephony mode or a photographing mode. The processed image frames may be displayed on a display 151, which may be a touch screen.

The image frames processed by the camera 121 may be stored in the memory 160 or may be transmitted to an external device through the wireless communication unit 110. The mobile terminal 100 may also include at least two cameras 121.

The microphone 122 may receive an external audio signal in a call mode, a recording mode and/or a speech recognition mode, and the microphone 122 may process the received audio signal into electric audio data. The audio data may then be converted into a form that can be transmitted to a mobile communication base station through the mobile communication module 112 and output in the call mode. The microphone 122 may employ various noise removal algorithms (or noise canceling algorithm) for removing or reducing noise generated when the external audio signal is received.

The user input unit 130 may receive input data for controlling operation of the mobile terminal 100 from a user. The user input unit 130 may include a keypad, a dome switch, a touch pad (constant voltage/capacitance), a jog wheel, a jog switch and/or so on.

The sensing unit 140 may sense a current state of the mobile terminal 100, such as an open/close state of the mobile terminal 100, a position of the mobile terminal 100, whether a user touches the mobile terminal 100, a direction of the mobile terminal 100, and acceleration/deceleration of the mobile terminal 100, and the sensing unit 140 may generate a sensing signal for controlling operation of the mobile terminal 100. For example, in an example of a slide phone, the sensing unit 140 may sense whether the slide phone is opened or closed. Further, the sensing unit 140 may sense whether the power supply 190 supplies power and/or whether the interface 170 is connected to an external device. The sensing unit 140 may also include a proximity sensor 141. The sensing unit 140 may sense a motion of the mobile terminal 100.

The output unit 150 may generate visual, auditory and/or tactile output, and the output unit 150 may include the display 151, an audio output module 152, an alarm 153 and a haptic module 154. The display 151 may display information processed by the mobile terminal 100. The display 151 may display a user interface (UI) and/or a graphic user interface (GUI) related to a telephone call when the mobile terminal 100 is in the call mode. The display 151 may also display a captured and/or received image, a UI or a GUI when the mobile terminal 100 is in the video telephony mode or the photographing mode.

The display 151 may include at least one of a liquid crystal display, a thin film transistor liquid crystal display, an organic light-emitting diode display, a flexible display and/or a three-dimensional display. The display 151 may be of a transparent type or a light transmissive type. That is, the display 151 may include a transparent display.

The transparent display may be a transparent liquid crystal display. A rear structure of the display 151 may also be of a light transmissive type. Accordingly, a user may see an object located behind the body (of the mobile terminal 100) through the transparent area of the body of the mobile terminal 100 that is occupied by the display 151.

The mobile terminal 100 may also include at least two displays 151. For example, the mobile terminal 100 may include a plurality of displays 151 that are arranged on a single face at a predetermined distance or integrated displays. The plurality of displays 151 may also be arranged on different sides.

When the display 151 and a sensor sensing touch (hereafter referred to as a touch sensor) form a layered structure that is referred to as a touch screen, the display 151 may be used as an input device in addition to an output device. The touch sensor may be in the form of a touch film, a touch sheet, and/or a touch pad, for example.

The touch sensor may convert a variation in pressure applied to a specific portion of the display 151 or a variation in capacitance generated at a specific portion of the display 151 into an electric input signal. The touch sensor may sense pressure of touch as well as position and area of the touch.

When the user applies a touch input to the touch sensor, a signal corresponding to the touch input may be transmitted to a touch controller. The touch controller may then process the signal and transmit data corresponding to the processed signal to the controller 180. Accordingly, the controller 180 may detect a touched portion of the display 151.

The proximity sensor 141 (of the sensing unit 140) may be located in an internal region of the mobile terminal 100, surrounded by the touch screen, and/or near the touch screen. The proximity sensor 141 may sense an object approaching a predetermined sensing face or an object located near the proximity sensor 141 using an electromagnetic force or infrared rays without having mechanical contact. The proximity sensor 141 may have a lifetime longer than a contact sensor and may thus have a wide application in the mobile terminal 100.

The proximity sensor 141 may include a transmission type photo-electric sensor, a direct reflection type photo-electric sensor, a mirror reflection type photo-electric sensor, a high-frequency oscillating proximity sensor, a capacitive proximity sensor, a magnetic proximity sensor, and/or an infrared proximity sensor. A capacitive touch screen may be constructed such that proximity of a pointer is detected through a variation in an electric field according to the proximity of the pointer. The touch screen (touch sensor) may be classified as a proximity sensor 141.

For ease of explanation, an action of the pointer approaching the touch screen without actually touching the touch screen may be referred to as a proximity touch and an action of bringing the pointer into contact with the touch screen may be referred to as a contact touch. The proximity touch point of the pointer on the touch screen may correspond to a point of the touch screen at which the pointer is perpendicular to the touch screen.

The proximity sensor 141 may sense the proximity touch and a proximity touch pattern (e.g., a proximity touch distance, a proximity touch direction, a proximity touch velocity, a proximity touch time, a proximity touch position, a proximity touch moving state, etc.). Information corresponding to the sensed proximity touch action and proximity touch pattern may then be displayed on the touch screen.

The audio output module 152 may output audio data received from the wireless communication unit 110 or stored in the memory 160 in a call signal receiving mode, a telephone call mode or a recording mode, a speech recognition mode and a broadcasting receiving mode. The audio output module 152 may output audio signals related to functions, such as a call signal incoming tone and a message incoming tone, performed in the mobile terminal 100. The audio output module 152 may include a receiver, a speaker, a buzzer, and/or the like. The audio output module 152 may output sounds through an earphone jack. The user may hear the sounds by connecting an earphone to the earphone jack.

The alarm 153 may output a signal for indicating generation of an event of the mobile terminal 100. For example, an alarm may be generated when receiving a call signal, receiving a message, inputting a key signal, and/or inputting a touch. The alarm 153 may also output signals in forms different from video signals or audio signals, for example, a signal for indicating generation of an event through vibration. The video signals and/or the audio signals may also be output through the display 151 or the audio output module 152.

The haptic module 154 may generate various haptic effects that the user can feel. One example of the haptic effects is vibration. An intensity and/or pattern of vibration generated by the haptic module 154 may also be controlled. For example, different vibrations may be combined and output or may be sequentially output.

The haptic module 154 may generate a variety of haptic effects including an effect of stimulus according to an arrangement of pins vertically moving against a contact skin surface, an effect of stimulus according to a jet force or sucking force of air through a jet hole or a sucking hole, an effect of stimulus of rubbing the skin, an effect of stimulus according to contact of an electrode, an effect of stimulus using an electrostatic force, and an effect according to a reproduction of cold and warmth using an element capable of absorbing or radiating heat in addition to vibrations.

The haptic module 154 may not only transmit haptic effects through direct contact but may also allow the user to feel haptic effects through a kinesthetic sense of the user's fingers or arms. The mobile terminal 100 may also include a plurality of haptic modules 154.

The memory 160 may store a program for operations of the controller 180 and/or temporarily store input/output data such as a phone book, messages, still images, and/or moving images. The memory 160 may also store data about vibrations and sounds in various patterns that are output from when a touch input is applied to the touch screen.

The memory 160 may include at least a flash memory, a hard disk type memory, a multimedia card micro type memory, a card type memory, such as SD or XD memory, a random access memory (RAM), a static RAM (SRAM), a read-only memory (ROM), an electrically erasable programmable ROM (EEPROM), a programmable ROM (PROM) magnetic memory, a magnetic disk and/or an optical disk. The mobile terminal 100 may also operate in relation to a web storage that performs a storing function of the memory 160 on the Internet.

The interface 170 may serve as a path to external devices connected to the mobile terminal 100. The interface 170 may receive data from the external devices or power and transmit the data or power to internal components of the mobile terminal 100 or transmit data of the mobile terminal 100 to the external devices. For example, the interface 170 may include a wired/wireless headset port, an external charger port, a wired/wireless data port, a memory card port, a port for connecting a device having a user identification module, an audio I/O port, a video I/O port, and/or an earphone port.

The interface 170 may also interface with a user identification module that is a chip that stores information for authenticating authority to use the mobile terminal 100. For example, the user identification module may be a user identify module (UIM), a subscriber identify module (SIM) and/or a universal subscriber identify module (USIM). An identification device (including the user identification module) may also be manufactured in the form of a smart card. Accordingly, the identification device may be connected to the mobile terminal 100 through a port of the interface 170.

The interface 170 may also be a path through which power from an external cradle is provided to the mobile terminal 100 when the mobile terminal 100 is connected to the external cradle or a path through which various command signals input by the user through the cradle are transmitted to the mobile terminal 100. The various command signals or power input from the cradle may be used as signals for confirming whether the mobile terminal 100 is correctly set in the cradle.

The controller 180 may control overall operations of the mobile terminal 100. For example, the controller 180 may perform control and processing for voice communication, data communication and/or video telephony. The controller 180 may also include a multimedia module 181 for playing multimedia. The multimedia module 181 may be included in the controller 180 or may be separated from the controller 180.

The controller 180 may perform a pattern recognition process capable of recognizing handwriting input or picture-drawing input applied to the touch screen as characters or images. The power supply 190 may receive external power and internal power and provide power required for operations of the components of the mobile terminal 100 under control of the controller 180.

According to hardware implementation, embodiments may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electrical units for executing functions. Embodiments may be implemented by the controller 180.

According to software implementation, embodiments such as procedures or functions may be implemented with a separate software module that executes at least one function or operation. Software codes may be implemented according to a software application written in an appropriate software language. The software codes may be stored in the memory 160 and executed by the controller 180.

FIG. 2A is a front perspective view of a mobile terminal (or a handheld terminal) according to an embodiment.

The mobile terminal 100 may be a bar type terminal body. However, embodiments are not limited to a bar type terminal and may be applied to terminals of various types including slide type, folder type, swing type and/or swivel type terminals having at least two bodies that are relatively movably combined.

The terminal body may include a case (a casing, a housing, a cover, etc.) that forms an exterior of the mobile terminal 100. In this embodiment, the case may be divided into a front case 101 and a rear case 102. Various electronic components may be arranged in the space formed between the front case 101 and the rear case 102. At least one middle case may be additionally provided between the front case 101 and the rear case 102.

The cases may be formed of plastics through injection molding or made of a metal material such as stainless steel (STS) or titanium (Ti).

The display 151, the audio output unit 152, the camera 121, the user input unit 130/131 and 132, the microphone 122 and the interface 170 may be arranged (or provided) in the terminal body, and more specifically may be arranged (or provided) in the front case 101.

The display 151 may occupy most of the main face of the front case 101. The audio output unit 152 and the camera 121 may be arranged in a region in proximity to one of both ends of the display 151 and the user input unit 131, and the microphone 122 may be located in a region in proximity to another end of the display 151. The user input unit 132 and the interface 170 may be arranged (or provided) on sides of the front case 101 and the rear case 102.

The user input unit 130 may receive commands for controlling operation of the mobile terminal 100, and may include a plurality of operating units 131 and 132. The operating units 131 and 132 may be referred to as manipulating portions and may employ any tactile manner in which a user operates the operating units 131 and 132 while having tactile feeling.

The first and second operating units 131 and 132 may receive various inputs. For example, the first operating unit 131 may receive commands such as start, end and scroll and the second operating unit 132 may receive commands such as control of a volume of sound output from the audio output unit 152 or conversion of the display 151 to a touch recognition mode.

Figure 2B:
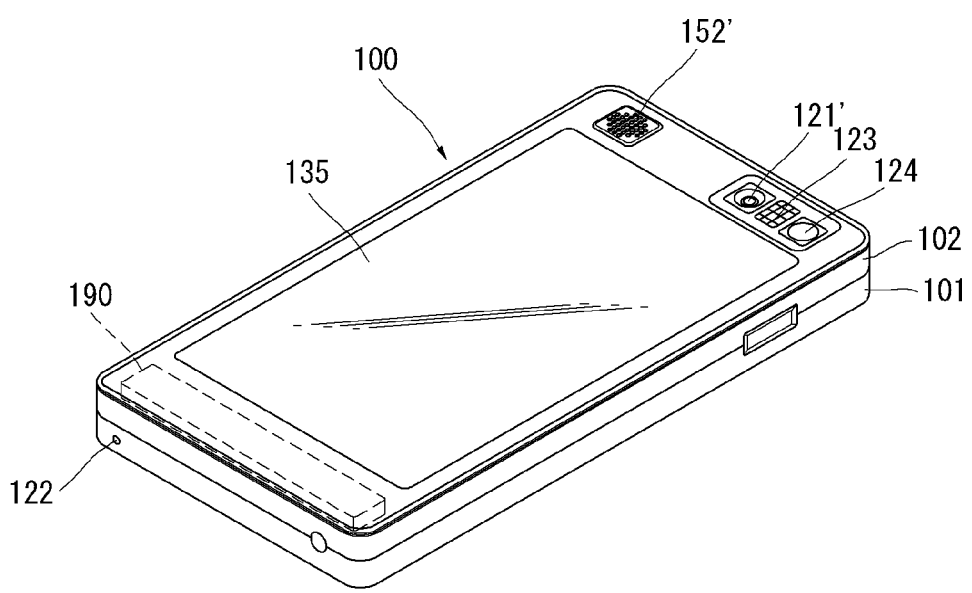
FIG. 2B is a rear perspective view of the mobile terminal according to an embodiment.

FIG. 2B is a rear perspective view of the mobile terminal (shown in FIG. 2A) according to an embodiment.

Referring to FIG. 2A, a camera 121' may be additionally attached to the rear side of the terminal body (i.e., the rear case 102). The camera 121' may have a photographing direction opposite to that of the camera 121 (shown in FIG. 2A) and may have pixels different from those of the camera 121 (shown in FIG. 2A).

For example, it may be desirable that the camera 121 has low pixels such that the camera 121 may capture an image of a face of a user and transmit the image to a receiving part in case of video telephony while the camera 121' has high pixels because the camera 121' captures an image of a general object and does not immediately transmit the image in many cases. The cameras 121 and 121' may be attached (or provided) to the terminal body such that the cameras 121 and 121' may rotate or pop-up.

A flash bulb 123 and a mirror 124 may be additionally provided in proximity to the camera 121'. The flash bulb 123 may light an object when the camera 121' takes a picture of the object. The mirror 124 may be used for the user to look at his/her face in the mirror when the user wants to self-photograph himself/herself using the camera 121'.

An audio output unit 152' may be additionally provided on the rear side of the terminal body. The audio output unit 152' may achieve a stereo function with the audio output unit 152 (shown in FIG. 2A) and may be used for a speaker phone mode when the terminal is used for a telephone call.

A broadcasting signal receiving antenna may be additionally attached (or provided) to the side of the terminal body in addition to an antenna for telephone calls. The antenna constructing a part of the broadcasting receiving module 111 (shown in FIG. 1) may be set in the terminal body such that the antenna may be pulled out of the terminal body.

The power supply 190 for providing power to the mobile terminal 100 may be set in the terminal body. The power supply 190 may be included in the terminal body or may be detachably attached to the terminal body.

A touch pad 135 for sensing touch may be attached to the rear case 102. The touch pad 135 may be of a light transmission type, such as the display 151. In this example, if the display 151 outputs visual information through both sides thereof, the visual information may be recognized (or determined) by the touch pad 135. The information output through both sides of the display 151 may be controlled by the touch pad 135. Otherwise, a display may be additionally attached (or provided) to the touch pad 135 such that a touchscreen may be arranged (or provided) even in the rear case 102.

The touch pad 135 may operate in connection with the display 151 of the front case 101. The touch pad 135 may be located in parallel with the display 151 behind the display 151. The touch panel 135 may be identical to or smaller than the display 151 in size.

Figure 2C:
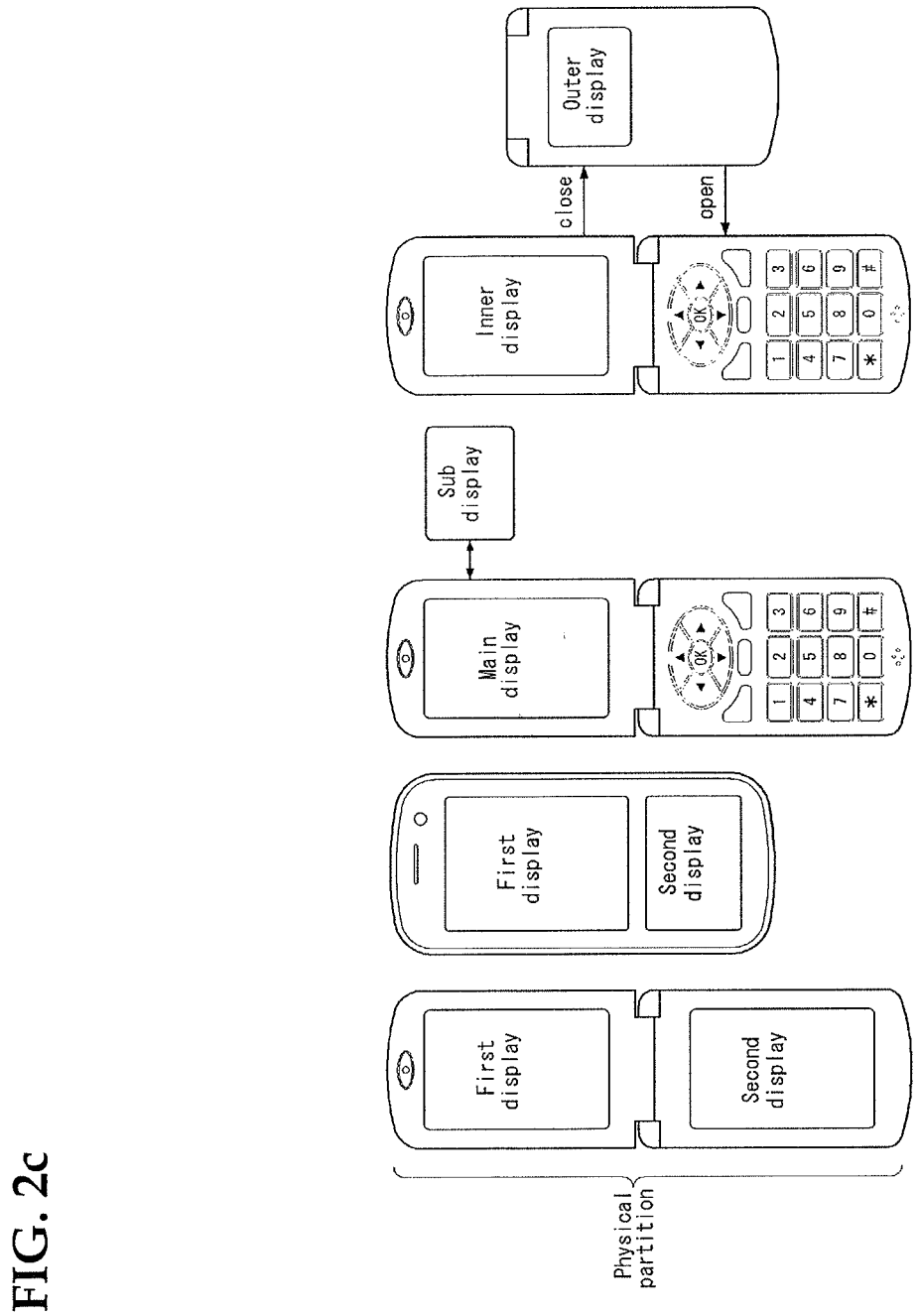
FIGS. 2C and 2D illustrate forms of the mobile terminal and display screens according to various embodiments.
Figure 2D:
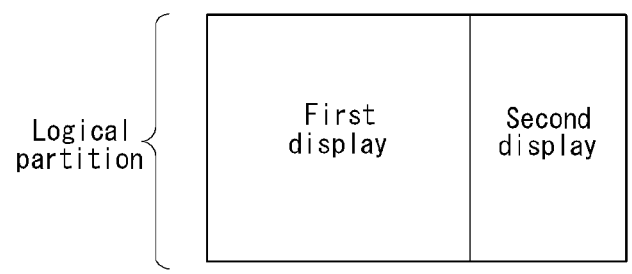

FIGS. 2C and 2D illustrate the mobile terminal 100 and the display 151 according to various embodiments.

Referring to FIG. 2C, the display 151 may include a first display and a second display that are physically separated from each other. In a folder type or slide type mobile terminal having two bodies connected through a hinge or a slide, the first display (or main display) may be formed on the inner face or outer face of one of the bodies, and the second display (or sub display) may be formed on the inner face or outer face of the other body. The sub display may be separated from the mobile terminal and may be detachably combined with the mobile terminal body through an interface to display data from the mobile terminal 100.

The display 151 may include first and second displays that may be logically separated from each other in a display panel, as shown in FIG. 2D.

Figure 3:
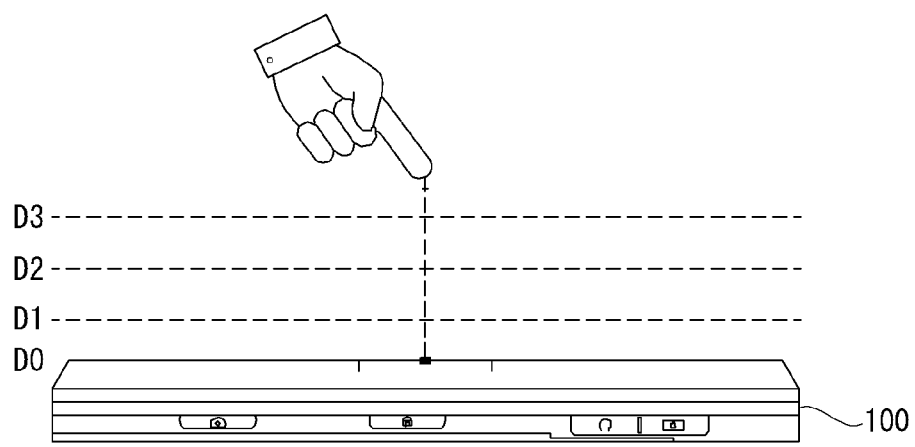
FIG. 3 is a view for explaining a proximity depth of a proximity sensor.

FIG. 3 is a view for explaining a proximity depth of a proximity sensor.

As shown in FIG. 3, when a pointer (such as a user's finger) approaches the touch screen, the proximity sensor located inside or near the touch screen may sense the approach of the pointer, and may output a proximity signal.

The proximity sensor may be constructed such that the proximity sensor outputs a proximity signal according to a distance between the pointer approaching the touch screen and the touch screen (referred to as "proximity depth").

The distance in which the proximity signal is output when the pointer approaches the touch screen may be referred to as a detection distance. The proximity depth may be determined by using a plurality of proximity sensors having different detection distances and by comparing proximity signals respectively output from the proximity sensors.

FIG. 3 shows a section of the touch screen in which proximity sensors capable of sensing three proximity depths may be provided. Proximity sensors capable of sensing less than three or more than four proximity depths may be provided in the touch screen.

More specifically, when the pointer completely contacts the touch screen (D0), it may be recognized as contact touch. When the pointer is located within a distance D1 from the touch screen, it may be recognized as a proximity touch of a first proximity depth. When the pointer is located in a range between the distance D1 and a distance D2 from the touch screen, it may be recognized as a proximity touch of a second proximity depth. When the pointer is located in a range between the distance D2 and a distance D3 from the touch screen, it may be recognized as a proximity touch of a third proximity depth. When the pointer is located greater than the distance D3 from the touch screen, it may be recognized as cancellation of the proximity touch.

Accordingly, the controller 180 may recognize the proximity touch as various input signals according to proximity distance and proximity position of the pointer with respect to the touch screen, and the controller 810 may perform various operation controls according to the input signals.

Figure 4:
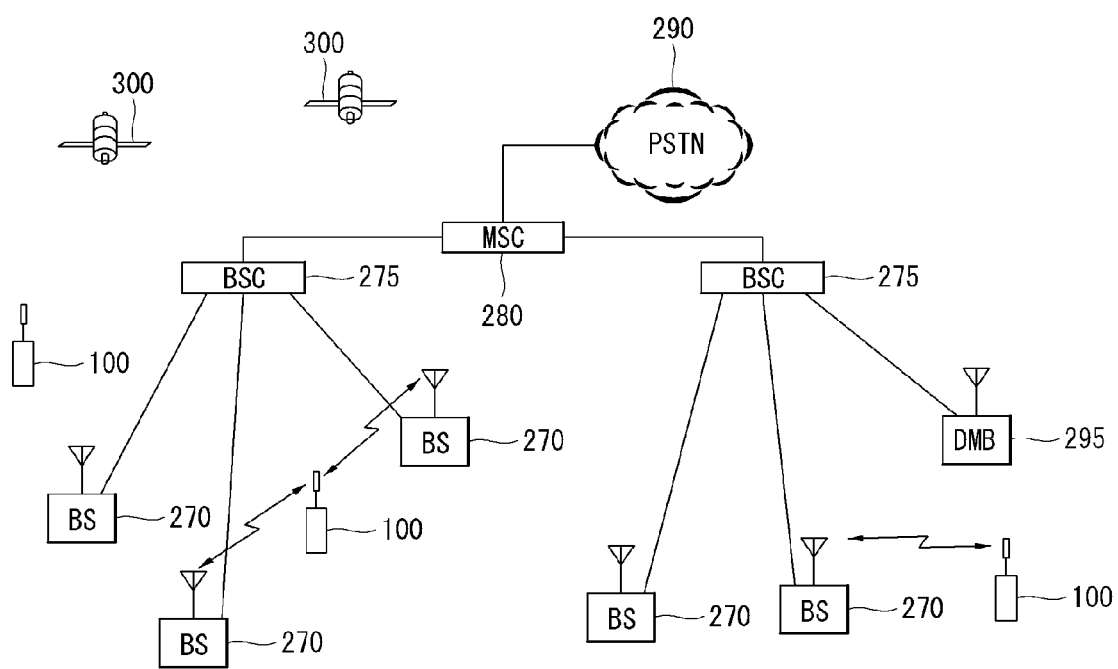
FIG. 4 illustrates a configuration of a CDMA wireless communication system communicating with the mobile terminal shown in FIG. 1.

Referring to FIG. 4, a CDMA wireless communication system includes mobile terminals 100, base stations 270, base station controllers 275, and a mobile switching center 280. The mobile switching center 280 is connected to a public switch telephone network (PSTN) 290. The mobile switching center 280 is connected to the base station controllers 275. The base station controllers 275 are connected to the base stations 270 through backhaul lines. The backhaul lines may be constructed according to E1/T1, ATM, IP, PPP, frame relay, HDSL, ADSL or xDSL well-known in the art. The CDMA wireless communication system may include at least two base station controllers 275.

Each base station 270 may include a sector or sectors and each sector may include an omnidirectional antenna or an antenna adjusted to a specific radiation direction from the base station 270. Otherwise, each sector may include two diversity reception antennas. Each base station 270 is constructed to have frequency assignments, and the frequency assignments may have specific spectra (for example, 1.25 MHz and 5 MHz).

Intersection of sectors and frequency assignments may be referred to a CDMA channel.

The base stations 270 may be referred to as base station transceiver subsystems (BTSs). "Base station" may be used as a term that collectively designates the base station controller 275 and one or more base stations 270 in several examples. Furthermore, the base stations 270 may be referred to as "cell sites". Otherwise, individual sectors of a given base station 270 may be referred to as cell sites.

A terrestrial DMB transmitter 295 can transmit broadcasting signals to the mobile terminals 100 operating in the CDMA wireless communication system. The broadcasting receiving module 111 of each mobile terminal 100 is constructed to receive the broadcasting signals transmitted from the DMB transmitter 295. This can be similarly applied to different types of broadcast and multicast signaling as described above.

FIG. 4 illustrates global positioning system (GPS) satellites 300. These satellites 300 can track the positions of some or all of the mobile terminals 100. Although two satellites are shown in FIG. 4, position information can be obtained from less than or more than two satellites. In addition, other position-tracking techniques (for example, position-tracking techniques that can substitute for GPS technique or can be added to the GPS technique) can be used. If required, some or all of the GPS satellites 300 can support satellite DMB transmission separately or additionally.

When the CDMA wireless communication system operates, the base stations 270 receive reverse link signals from the mobile terminals 100. The mobile terminals 100 may be in a state that the mobile terminals 100 are making calls, sending messages or performing other communications. The reverse link signals received by the base stations 270 are processed by the base stations 270. The processed data is transmitted to the base station controllers 275 connected to the base stations 270. The base station controllers 275 provide call resource allocation and mobility management functionality including soft handoffs between the base stations 270. Furthermore, the base station controllers 275 transmit the received data to the mobile switching center 280. The mobile switching center 280 provides additional routing services for interfacing with the PSTN 290. Similarly, the PSTN 290 interfaces with the mobile switching center 280, and the mobile switching center 280 interfaces with the base station controllers 275. The base station controllers 275 control the base stations 270 to transmit forward link signals to the mobile terminals 100.

Figure 5:
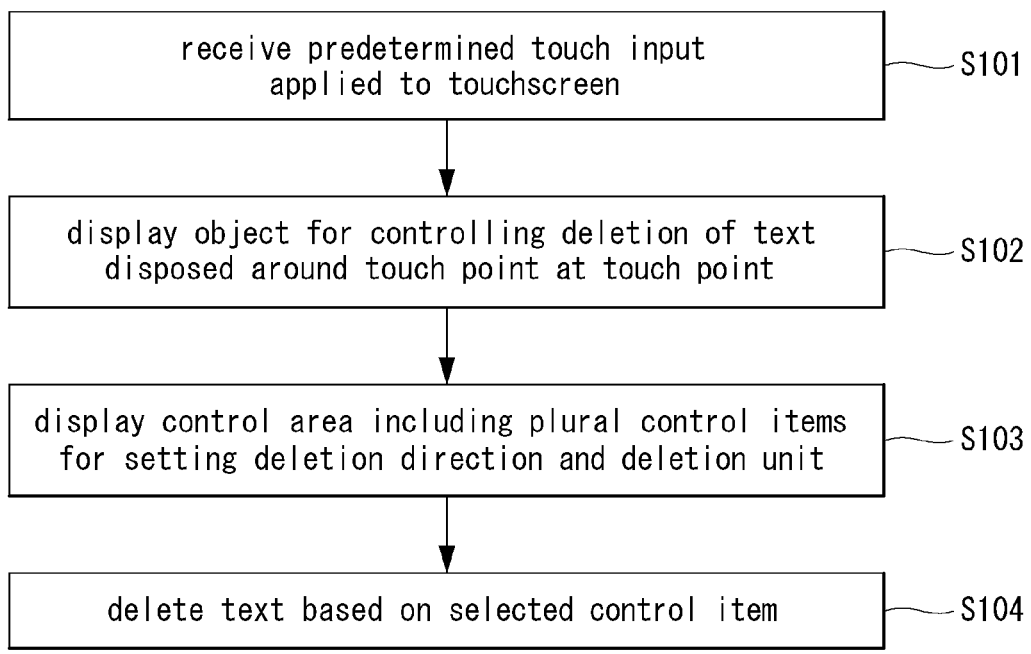
FIG. 5 is a flowchart illustrating a method of controlling a mobile terminal according to a first embodiment of the present invention.

FIG. 5 is a flowchart illustrating a method of controlling the mobile terminal according to a first embodiment of the present invention.

The controller 180 of the mobile terminal can receive a touch input for selecting a text displayed on the touchscreen 151 (S101). The controller 180 can receive a touch input for selecting a text to be deleted from texts displayed in a text area 10 of the touchscreen 151.

The controller 180 can display an object 5 on a point to which the touch input is applied (S102). The object 5 can indicate the touch point and a deletion start point.

The controller 180 can display a control area 20 for controlling at least one of a deletion direction and a deletion unit on the touchscreen 151 (S103). An icon for controlling at least one of the deletion direction corresponding to the left or right of the displayed object 5 and the deletion unit corresponding to a letter, a word or a sentence can be displayed in the control area 20.

The controller 180 can delete a text to the left or right on the basis of the object 5 on a character-by-character, word-by-word or sentence-by-sentence basis (S104). That is, the controller 180 can delete the text upon selection of an icon displayed in the control area 20.

FIGS. 6 to 10 illustrate the first embodiment of the present invention.

Figure 6:
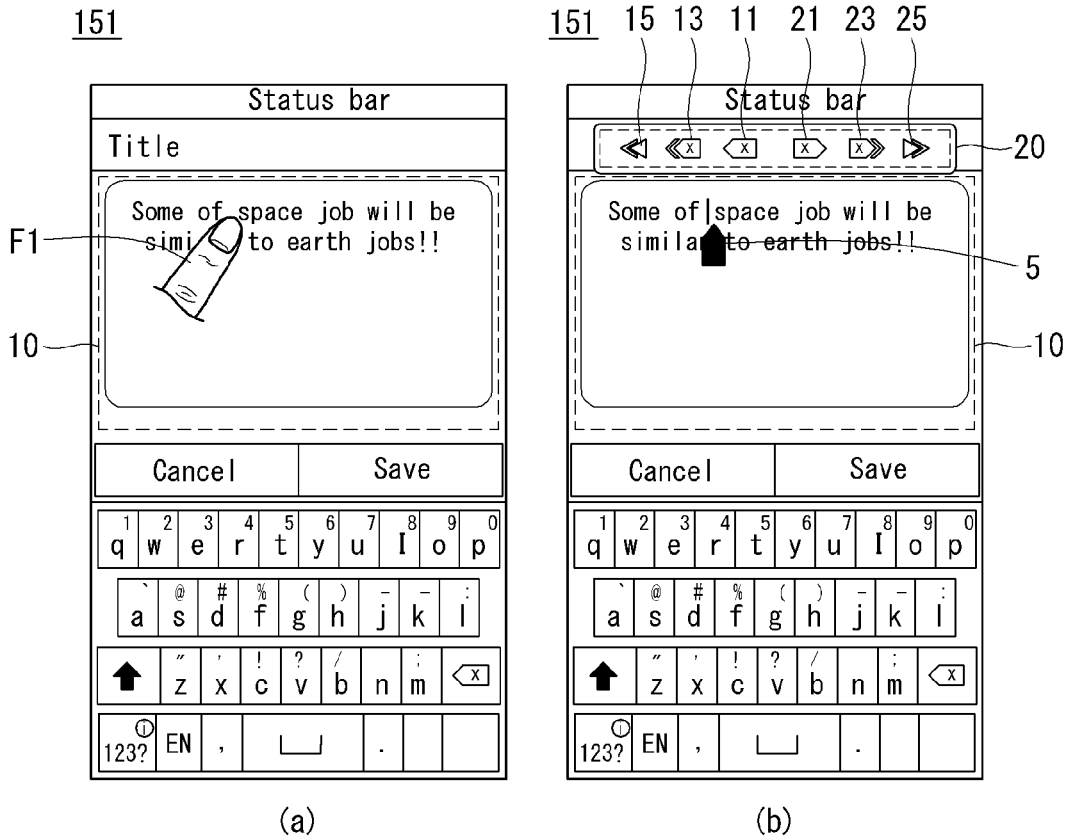

FIG. 6 illustrates an example of displaying the control area for deleting a text on the touchscreen.

As shown in FIGS. 6(a) and (b), upon reception of a touch input F1 for selecting a text displayed on the touchscreen 151, the controller 180 can display the object 5 on a point to which the touch input F1 is applied. The point on which the object 5 is displayed corresponds to a text deletion start point. The controller 180 can move the object 5 upon reception of a touch-and-drag input applied to the object 5. The deletion start point can be changed as the object 5 is moved.

The controller 180 can display the control area for controlling at least one of the text deletion direction and deletion unit on the touchscreen 151.

Icons 11, 13, 15, 21, 23 and 25 for controlling text deletion according to deletion direction and deletion unit can be displayed in the control area 20.

Referring to FIG. 6(c), the first icon 11 is used to delete a text letter by letter to the left, the second icon 13 is used to delete a text word by word to the left, the third icon 15 is used to delete a text sentence by sentence to the left, the fourth icon 21 is used to delete a text letter by letter to the right, a fifth icon 23 is used to delete a text word by word to the right, and the sixth icon 25 is used to delete a text sentence by sentence to the right.

The controller 180 can delete a text based on a selected deletion direction and deletion unit upon reception of a touch input for selecting one of the icons displayed in the control area 20.

Figure 7:
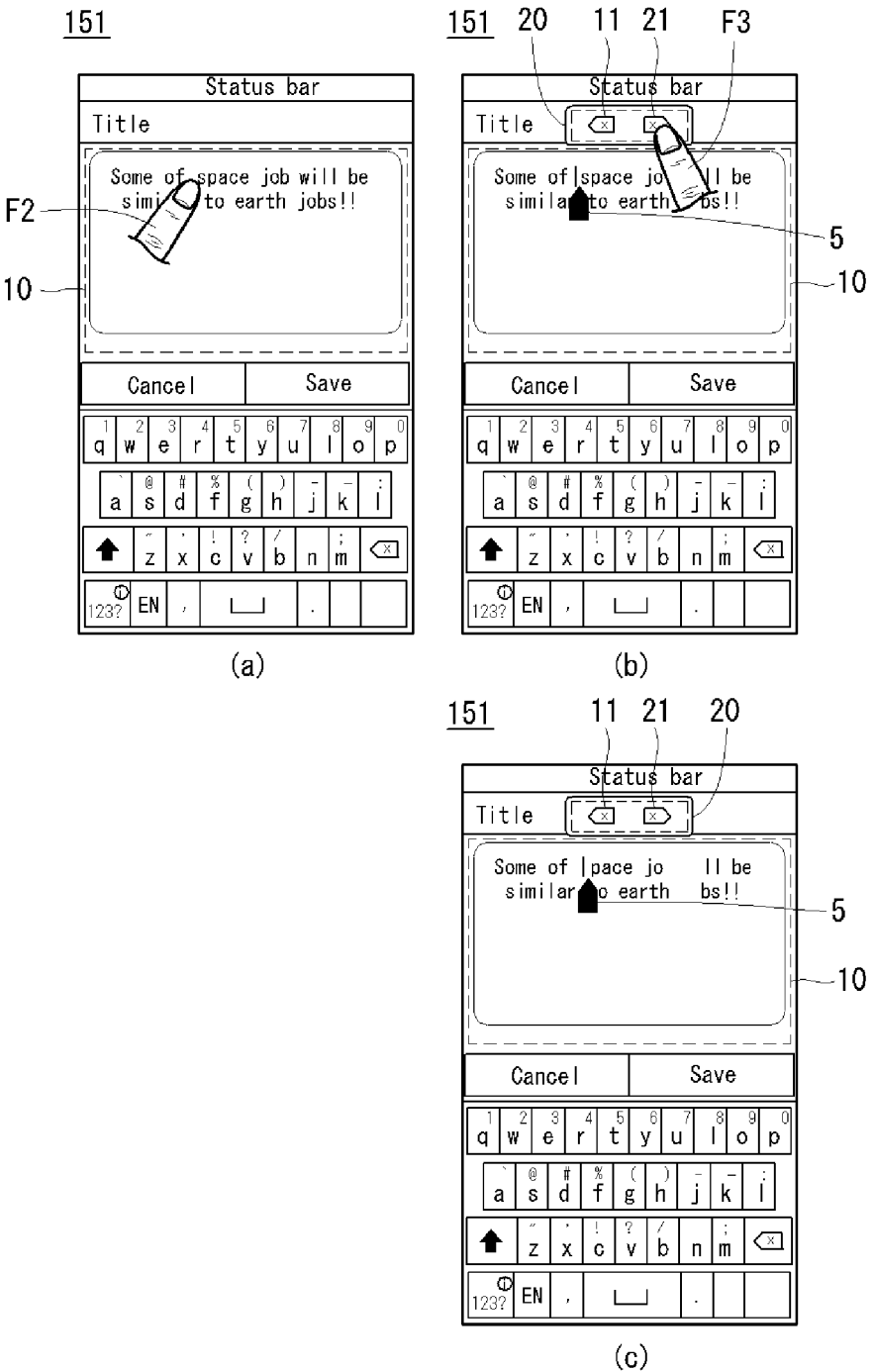

FIG. 7 illustrates an example of deleting a text based on a touch input applied to the control area 20.

Referring to FIGS. 7(a) and (b), the controller 180 can display the object 5 on a touch point upon reception of a touch input F2 for selecting a text.

Furthermore, the controller 180 can display the control area 20 for controlling at least one of the deletion direction and deletion unit of the text on the touchscreen 151. For example, the first icon 11 for deleting the text letter by letter to the left and the second icon 21 for deleting the text letter by letter to the right can be displayed in the control area 20.

The controller 180 can receive a touch input F3 applied to the second icon 21. Referring to FIG. 7(c), the controller 180 can delete the text letter by letter to the right based on the object 5 upon reception of the touch input F3 applied to the second icon 21. For example, when the object 5 is displayed at the left of the word "space" of a text displayed in the text area 10, the letter "s" on the right of the object 5 can be deleted.

FIG. 8 illustrates an example of deleting and recovering a text through the control area 20.

Upon reception of a touch input for selecting a text through the text area 10, the controller 180 can display the control area 20 for controlling the object 5 and deletion at the touch point corresponding to the touch input.

Referring to FIG. 8(a), the controller 180 can receive a touch input F4 for selecting an icon displayed in the control area 20, for example, the icon 21 for deleting a text letter by letter to the right.

Referring to FIG. 8(b), the letter "s" on the right of the object 5 in the text area 10 can be deleted. The controller 180 can receive a touch input F5 for selecting the icon 11 for deleting a text letter by letter to the left.

Referring to FIG. 8(c), a space corresponding to one letter on the left of the object 5 in the text area 10 can be deleted. The controller 180 can receive a touch input F6 for selecting an icon 31 for undoing deletion, that is, recovering the deleted text.

Referring to FIG. 8(d), it is possible to undo deletion, that is, recover the word "space" deleted in FIG. 8(c).

A user can delete a text on the left or right of the object 5 letter by letter, word by word or sentence by sentence through the control area 20. That is, the user can delete a text disposed in a desired direction by a desired degree by simply selecting an icon displayed in the control area 20.

Figure 9:
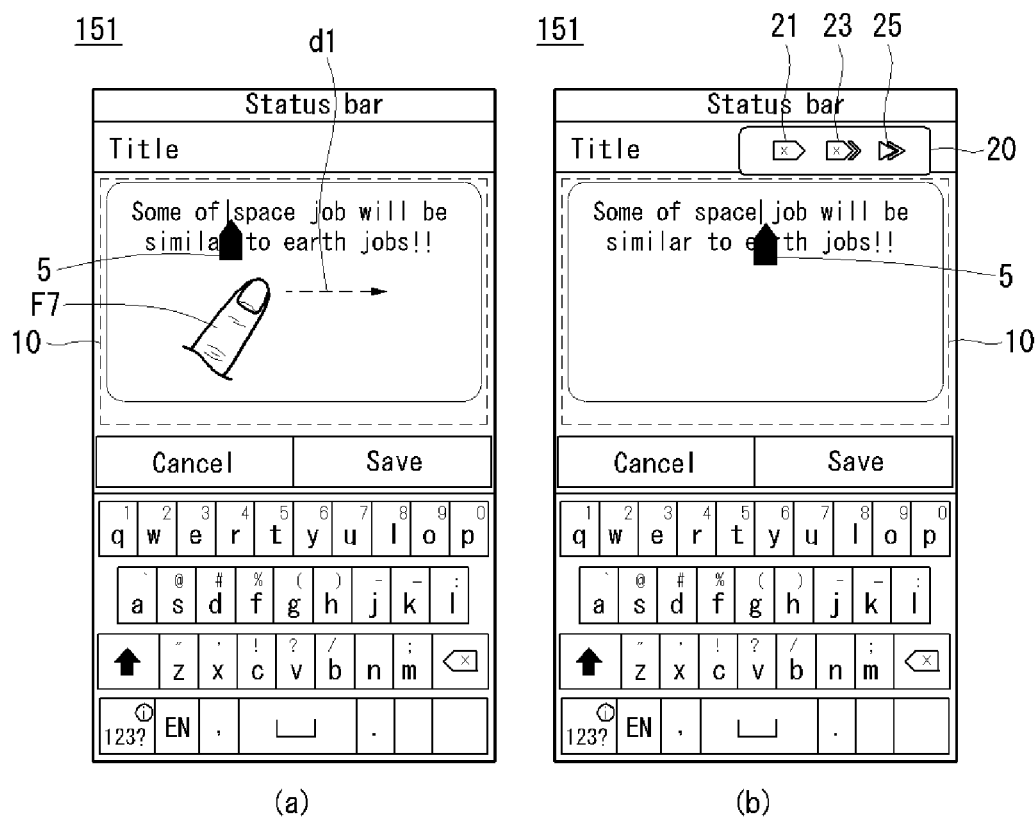

FIG. 9 shows display of some icons expected to be selected in the control area 20.

Referring to FIG. 9(a), the controller 180 can receive a drag input applied to the object 5 displayed in the text area 10. For example, the controller 180 can receive a drag input for moving the object 5 to the right.

Referring to FIG. 9(b), the controller 180 can display the icons 21, 23 and 25 for deleting a text to the right in the control area 20. That is, the icon 21 for deleting a text letter by letter to the right on the basis of the object 5, the icon 23 for deleting a text word by word to the right and the icon 25 for deleting a text sentence by sentient to the right can be displayed in the control area 20.

While FIG. 9 illustrates an example of dragging the object 5 to the right, the present invention can be applied to a case in which the object 5 is dragged to the left. That is, the controller 180 can display only icons for deleting a text to the left in the control area 20 upon reception of an input for dragging the object 5 to the left.

The controller 180 can recognize a direction in which the object 5 is dragged as a direction in which a text will be deleted and display only an icon for deleting the text letter by letter, word by word, or sentence by sentence in the deletion direction. Accordingly, icons expected to be used can be accessed more easily.

FIG. 10 illustrates an example of deleting a whole text displayed in the text area 10.

Referring to FIGS. 10(a), (b) and (c), upon reception of a touch input for selecting a text, the controller 180 can display the object 5 on the touch point. The controller 180 can display, on the touchscreen 151, the control area 20 in which an icon 30 for deleting the whole text displayed in the text area 10 is displayed upon reception of a touch input F8 applied to the object 5.

Referring to FIGS. 10(b) and (c), the controller 180 can delete the whole text upon reception of a touch input F4 applied to the icon 30 for deleting the whole text displayed in the text area 10.

Figure 11:
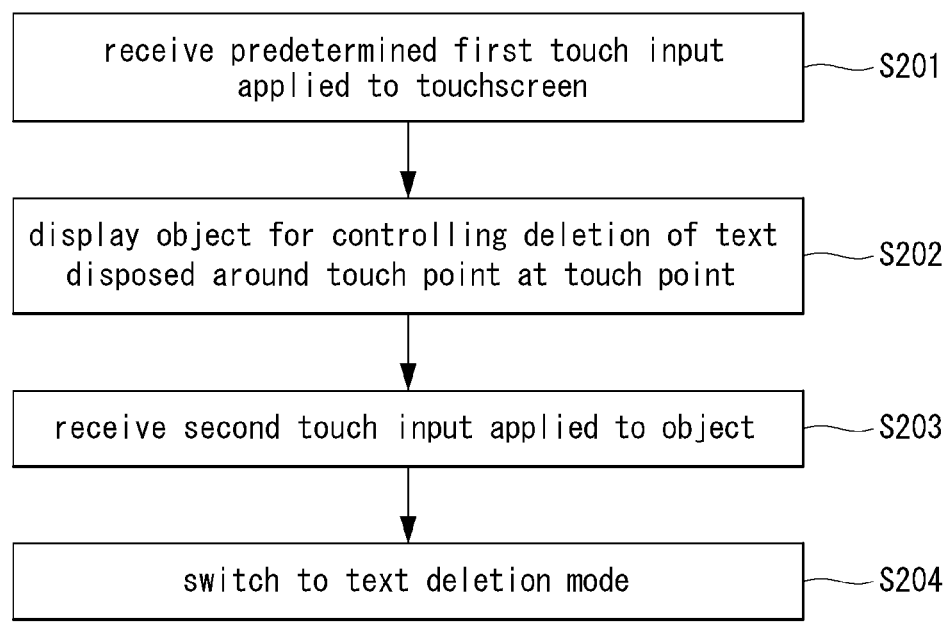
FIG. 11 is a flowchart illustrating a method of controlling a mobile terminal according to a second embodiment of the present invention.

FIG. 11 is a flowchart illustrating a method of controlling the mobile terminal according to a second embodiment of the present invention.

The controller 180 can receive a touch input for selecting a text displayed on the touchscreen 151 (S201). That is, the user can select a text to be deleted from texts displayed in the text area 10 of the touchscreen 151 by touching the text.

Figure 12:
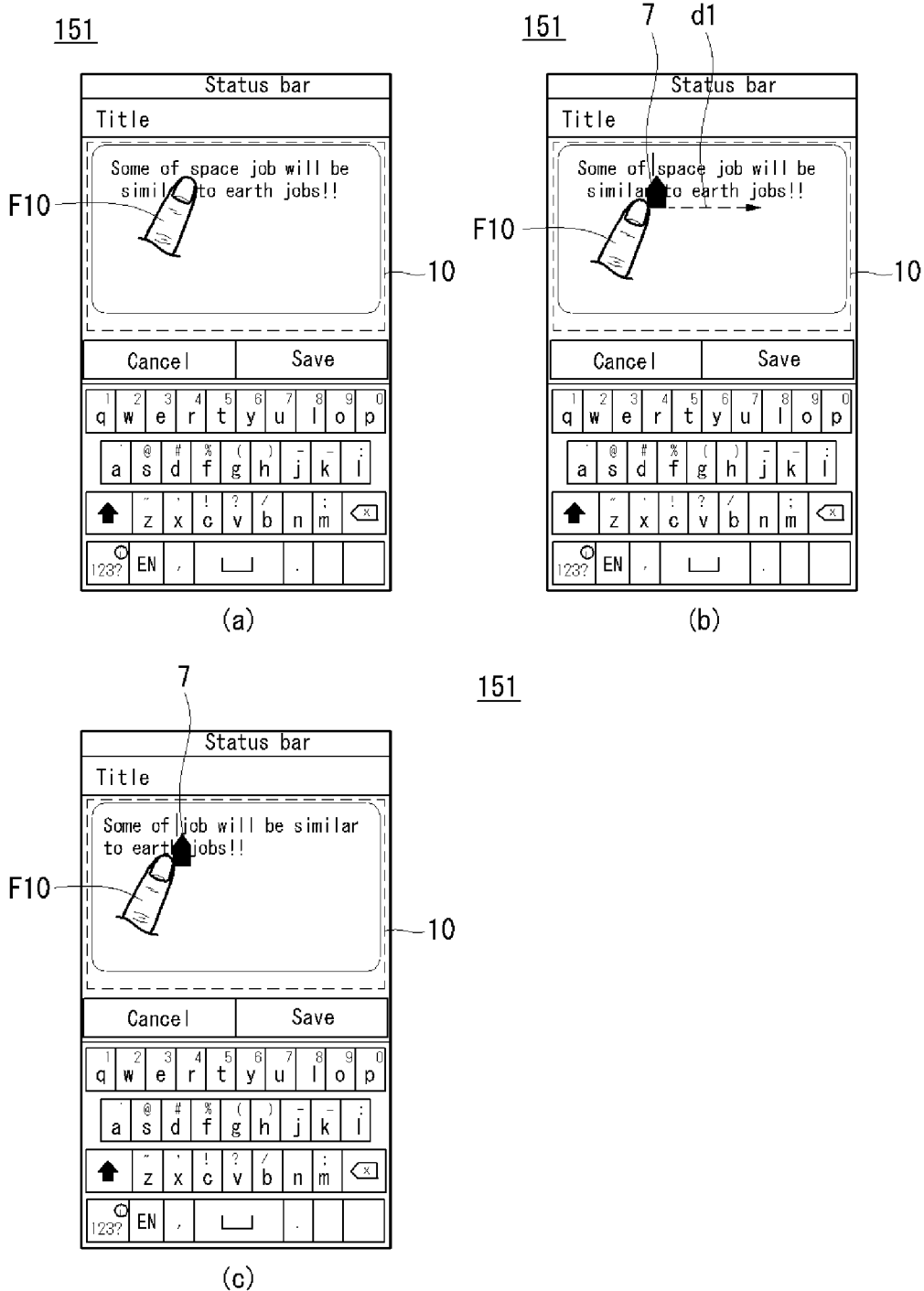
FIGS. 12 and 13 illustrate the second embodiment of the present invention.

The controller 180 can display an object 7 on a point to which the touch input is applied (S202). The object 7 can be used as a means for indicating the touch point and deleting a text in a text deletion mode. The shape of the object 7, shown in FIG. 12, is an exemplary and the object 7 can be displayed in various icon forms such as a triangle, an arrow, etc.

The controller 180 can receive a touch input applied to the object 7 (203).

The controller 180 can control the mobile terminal 100 to enter the text deletion mode upon reception of a touch input applied to the object 7, for example, a touch input according to predetermined standards such as two-time tapping, three-time tapping, long touch and the like (S204).

The controller 180 can display the object 7 in the text deletion mode such that the object 7 is discriminated from the object displayed before the mobile terminal 100 enters the text deletion mode by changing the color of the object 7.

The controller 180 can rapidly delete a text upon reception of a manipulation signal (e.g. drag input) applied to the object 7 in the text deletion mode.

Figure 13:
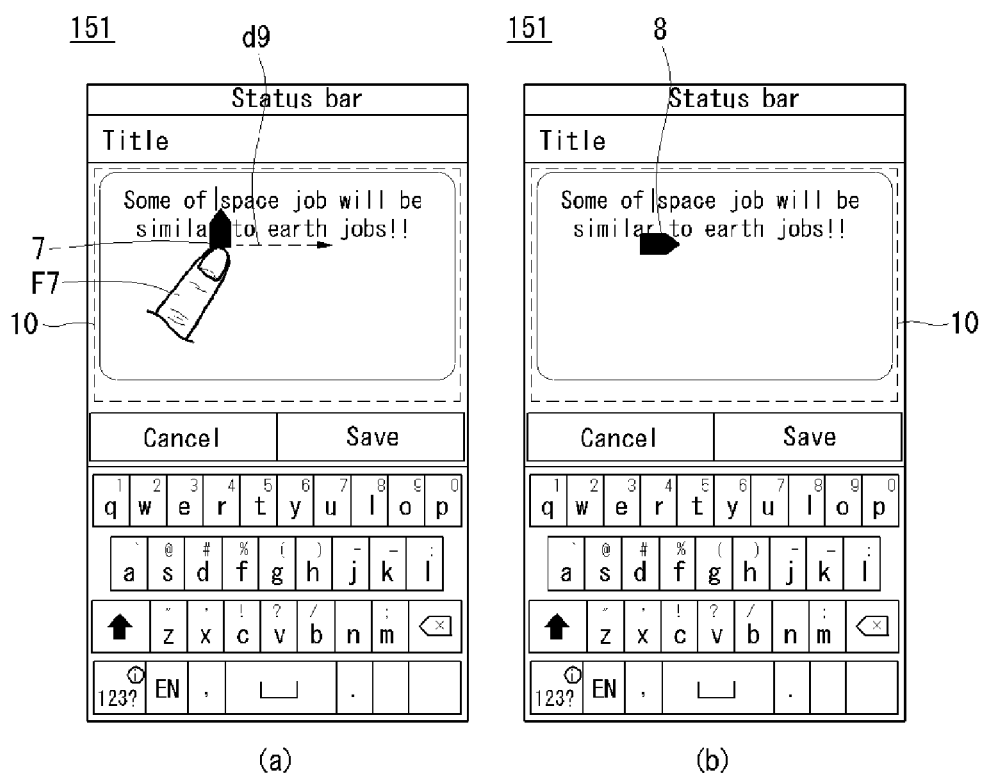

FIGS. 12 and 13 illustrate the second embodiment of the present invention.

FIG. 12 illustrates an example of deleting text by manipulating the object 7.

Referring to FIG. 12(a), the controller 180 can receive a touch input F10 for selecting a text displayed on the touchscreen 151.

Referring to FIG. 12(b), the controller 180 can display the object 7 on the point to which the touch input F10 is applied.

The controller 180 can control the mobile terminal 100 to enter the text deletion mode upon reception of a touch input applied to the object 7. For example, the controller 180 can control the mobile terminal 100 to enter the text deletion mode when long touch is applied to the object 7 and indicate the text deletion mode by changing the color of the object 7.

The controller 180 can maintain the text deletion mode while the touch input F10 is maintained. When the user drags the object 7 in a first direction, the controller 180 can delete a text included within a range in which the object 7 is dragged. For example, if the user drags the object 7 to the right dl, the controller 180 can delete a text (e.g. "space") included within a range in which the object 7 is dragged.

Referring to FIG. 12(c), the controller 180 can fill the region from which the text (e.g. "space") has been deleted with the next text, that is, a text on the right of the region. That is, the controller 180 can sequentially arrange texts from the left of the top line and align the texts leaving a space corresponding to one letter between words.

Alternatively, the controller 180 can leave the region from which the text has been deleted as a vacant region or a box to indicate the region from which the text has been deleted until a text edition mode is completed. Upon completion of the text edition mode, the controller 180 can display texts without a vacant space except for a space corresponding to one letter between words.

FIG. 13 illustrates an example of changing the direction of the object 7 displayed on the touchscreen 151 such that the user can be aware of a text deletion direction intuitively.

Referring to FIGS. 13(a) and (b), the controller 180 can receive a touch-and-drag input F7 applied to the object 7. When the user drags the object 7 to the right d9, the controller 180 can display the object 8 pointing to the right. Accordingly, the user can be intuitively aware that a text on the right of the object 8 will be deleted.

Figure 14:
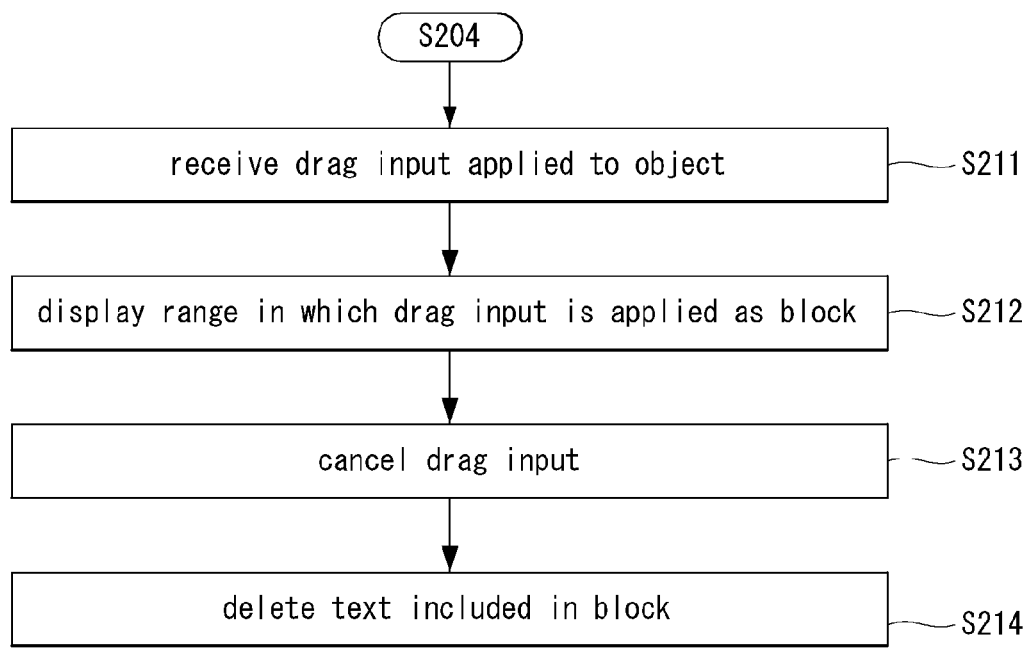
FIG. 14 is a flowchart illustrating a method of controlling a mobile terminal according to a third embodiment of the present invention.

FIG. 14 is a flowchart illustrating a method of controlling the mobile terminal according to a third embodiment of the present invention.

The controller 180 can receive a drag input applied to the object 7 (S211) while the text deletion mode is maintained (S204). That is, the controller 180 can receive a drag input applied to a text to be deleted while a touch input applied to the object 7 is maintained.

The controller 180 can display a range in which the drag input is applied as a block (S212). Alternatively, the range can be displayed such that the range is discriminated from other texts by being displayed as a box, being displayed in a changed color, or being underlined.

The controller 180 can delete a text included within the blocked range upon cancellation of the drag input (S213 and S214). That is, the controller 180 can finish the text deletion mode and, simultaneously, delete the text included within the blocked range upon cancellation of the drag input. Accordingly, text deletion can be rapidly performed.

Figure 15:
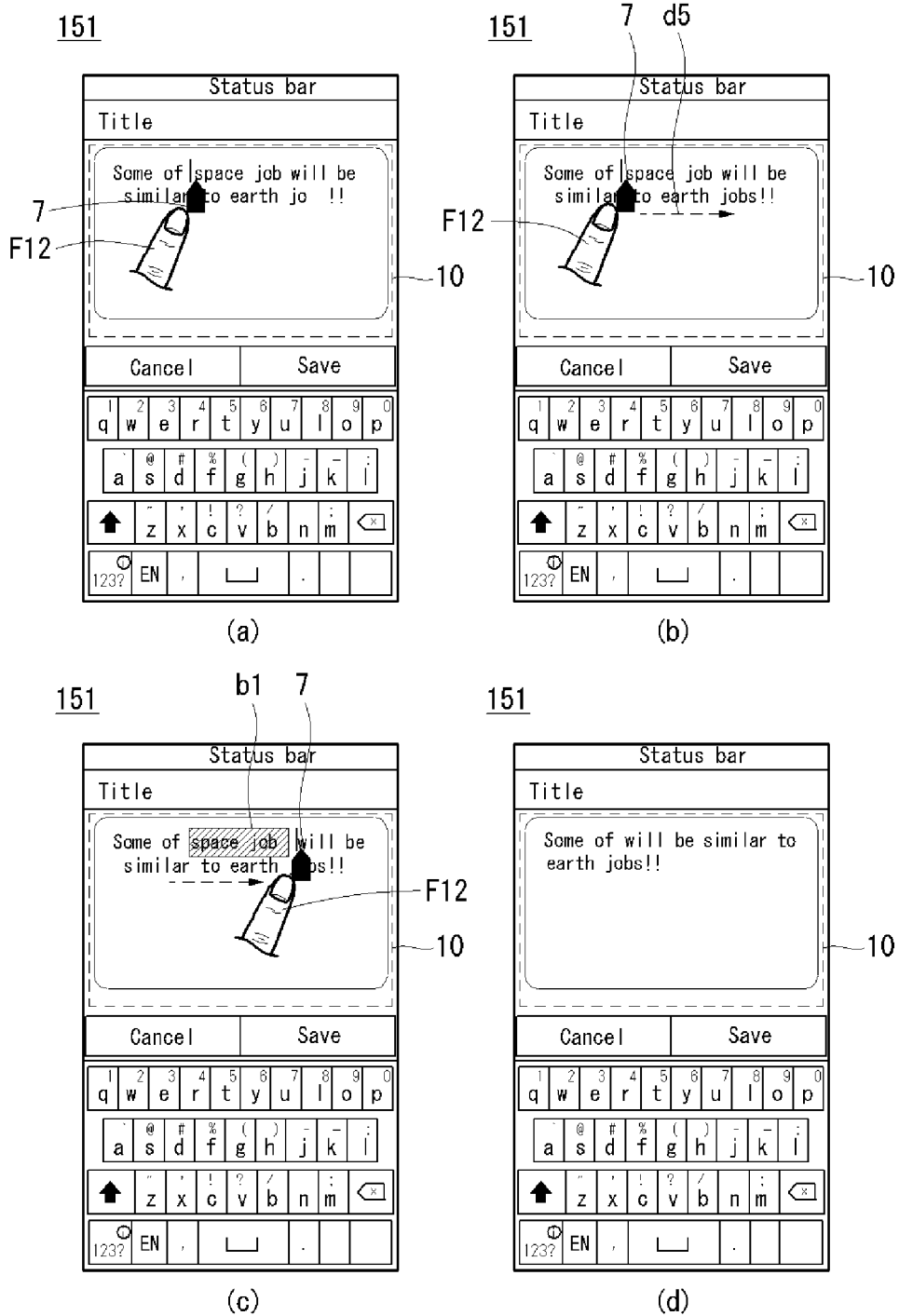
FIG. 15 illustrates the third embodiment of the present invention.

FIG. 15 illustrates the third embodiment of the present invention.

Referring to FIG. 15(a), the controller 180 can control the mobile terminal 100 to enter the text deletion mode upon reception of a touch input F12 applied to the object 7. The controller 180 can change the color of the object 7 to indicate that the mobile terminal 100 is in the text deletion mode.

Referring to FIGS. 15(b) and (c), the controller 180 can receive a drag input F12 applied to the object 7. For example, when the user drags the object 7 to the right d5 in the text deletion mode, the controller 180 can display a range in which the object 7 is dragged as a block b1.

Referring to FIG. 15(d), the controller 180 can delete a text included in the block b1 upon cancellation of the drag input F12.

That is, the controller 180 can display a region in which the object 7 is dragged as a block upon reception of a touch-and-drag input applied to the object 7 and delete a text included in the block upon cancellation of the touch-and-drag input.

A text can be deleted only by cancelling a drag input applied to the object 7 when a range including the text is displayed as a block according to the drag input, and thus rapid text edition can be achieved.

Figure 16:
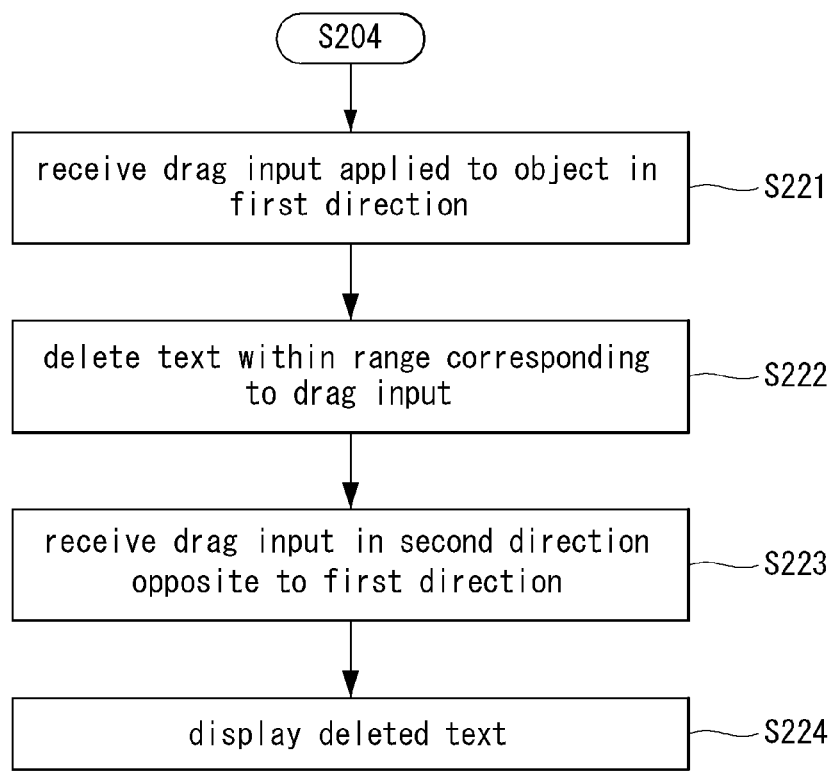
FIG. 16 is a flowchart illustrating a method of controlling a mobile terminal according to a fourth embodiment of the present invention.

FIG. 16 is a flowchart illustrating a method of controlling the mobile terminal according to a fourth embodiment of the present invention.

Referring to FIG. 16, when the user drags the object in the first direction (S221), the controller 180 can delete a text included within a range in which the object is dragged (S222).

That is, when the user drags the object 7 (shown in FIG. 17) in one direction in the text deletion mode (S204), the controller 180 can delete a text included within a range in which the object 7 is dragged. Furthermore, the controller 180 can display the range such that the range is discriminated from other texts. For example, the controller 180 can display the range as a block or a box, change the color of the range, etc.

The controller 180 can receive a drag input in a second direction opposite to the first direction (S223). For example, if the controller 180 receives a drag input to the right in step S221, the controller 180 receives a drag input to the left in step S223. In this case, the drag inputs are applied in such a manner that the user touches and drags the object with a finger in the first direction and change the direction of the drag to the second direction without separating the finger from the touchscreen.

The controller 180 can re-display the deleted text (S224) upon reception of the drag input in step S223. That is, the controller 180 can repeat deletion and recovering of a text when a drag input is repeatedly applied in the text deletion mode. For example, the word "space" can be deleted upon reception of a drag input applied to the word "space" and the word "space" can be recovered and displayed upon reception of a drag input applied to a region in which the word "space" was disposed before deletion while the touch is maintained.

Figure 17:
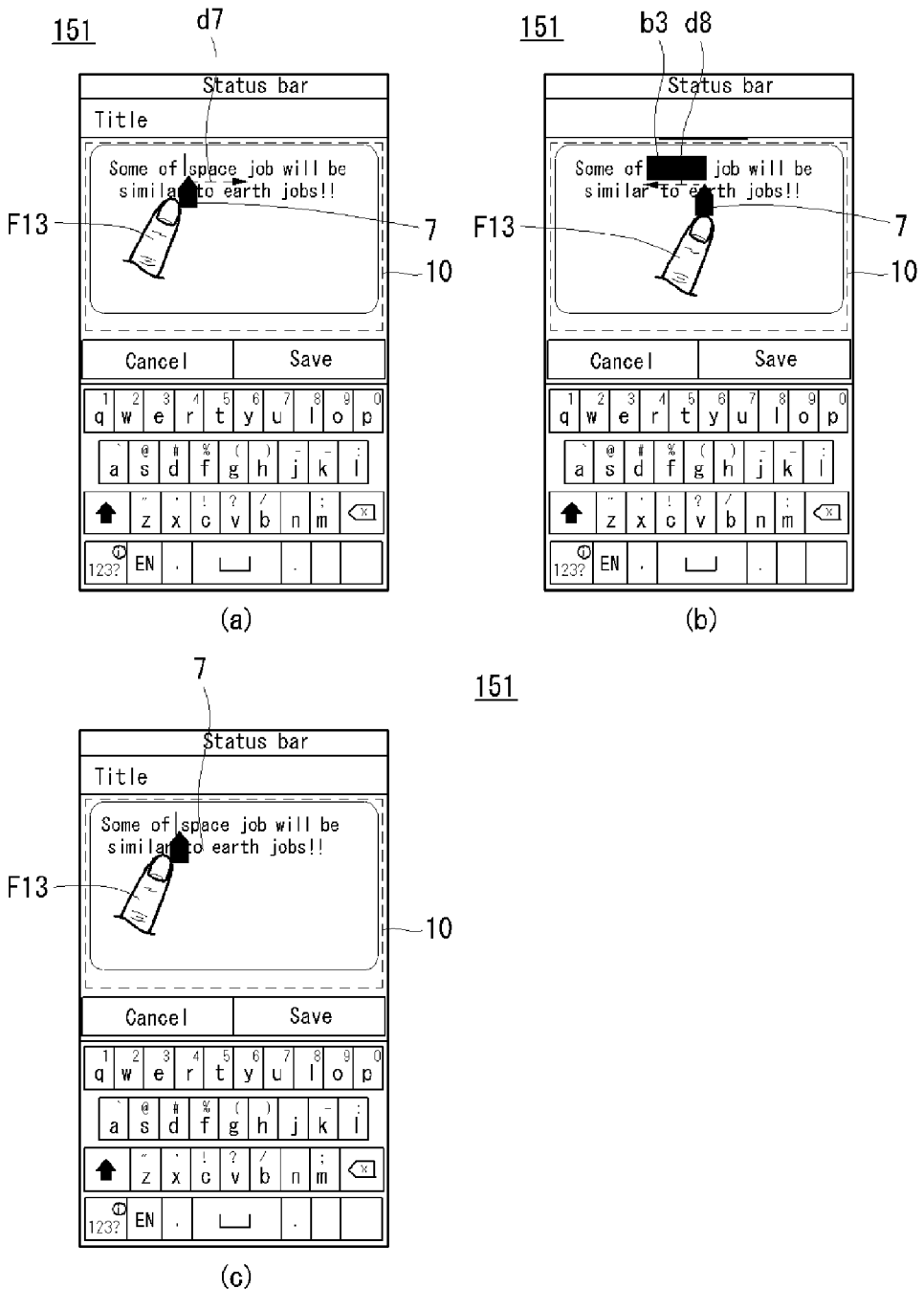
FIG. 17 illustrates the fourth embodiment of the present invention.

FIG. 17 illustrates the fourth embodiment of the present invention.

Referring to FIG. 17(a), the controller 180 can receive a drag input applied to the object 7 in the first direction in the text deletion mode. For example, the controller 180 can receive a drag input F13 to the right d7, applied to the object 7.

Referring to FIGS. 17(*a*) and (*b*), the controller 180 can display a range in which the drag input F13 is applied as a block b3 upon reception of the drag input F13 in the direction d7, applied to the object 7. In this case, the controller 180 can display the range as the block b3 and, simultaneously, delete a text corresponding to the block b3.

The controller 180 can maintain the text deletion mode while a touch input applied to the object 7 is maintained. The controller 180 can cancel display of the block b3 upon reception of a drag input to the left d8 opposite to the drag direction of FIG. 17(*a*), applied to the object 7, while the text deletion mode is maintained. The controller 180 can cancel display of the block b3 and, simultaneously, recover the deleted text and display the recovered text (FIG. 17(*c*)).

That is, when the user drags the object with the finger F13 to the left and right without detaching the finger F13 from the touchscreen 151, a text corresponding to the dragged region is deleted. When the user drags the region from which the text has been deleted, the deleted text is recovered. For example, when the user touches the object 7 and drags the touched object 7 to the right to delete a text and then drags the object 7 to the left without detaching the finger from the touchscreen 151, the deleted text can be recovered.

Figure 18:
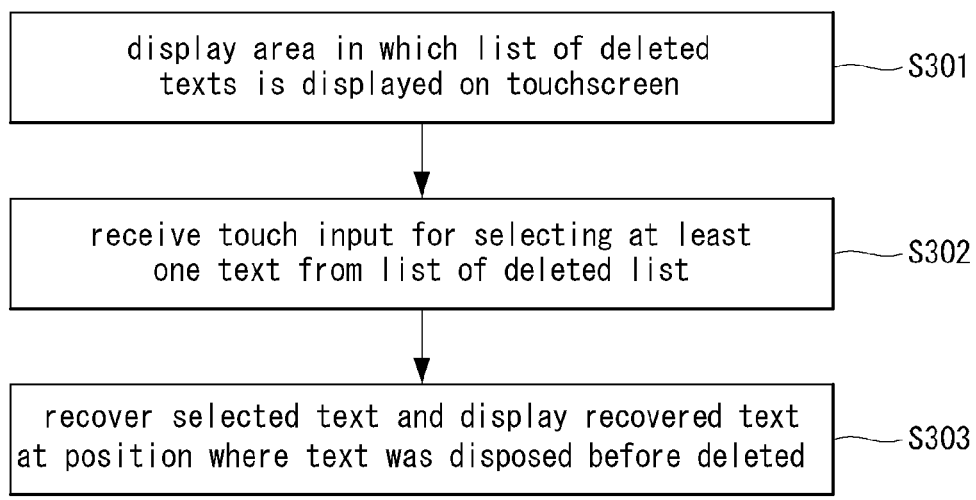
FIG. 18 is a flowchart illustrating a method of controlling a mobile terminal according to an example of recovering a deleted text.

FIG. 18 is a flowchart illustrating a method of controlling the mobile terminal to recover a deleted text.

The controller 180 can display an area in which a list of deleted texts is displayed on the touchscreen 151 (S301). The controller 180 can display the area in which a list of texts, that is, letters, words and sentences, deleted in the text edition mode on the touchscreen 151. That is, the controller 180 can sequentially store a predetermined number of deleted texts in the list according to predetermined standards.

The controller 180 can receive a touch input for selecting at least one of deleted texts from the list (S302). The touch input may correspond to one touch, two-time tapping, long touch, etc. according to predetermined standards.

The controller 180 can recover a text selected by the touch input and display the text at a position where the text was disposed before deleted (S303).

When a text is mistakenly deleted or a deleted text needs to be recovered during an edition process, the text can be easily recovered only by selecting the text from the list of deleted texts.

Figure 19:
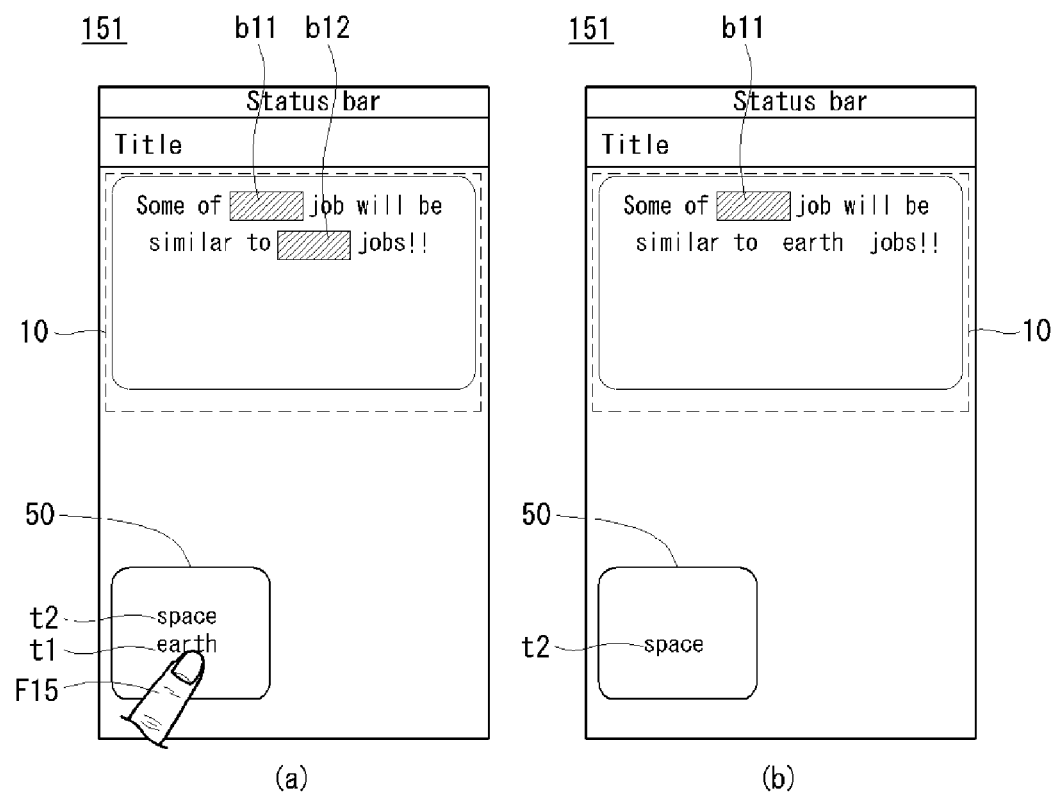

FIGS. 19, 20 and 21 illustrate examples of recovering a deleted text.

Referring to FIG. 19, the controller 180 can display an area 50 in which a list of deleted texts is displayed on the touchscreen 151.

Blocks b11 and b12 substituting for deleted texts may be displayed in the text area 10.

Upon reception of a touch input for selecting at least one of the deleted texts from the list, the controller 180 can recover the selected text and display the text at a position where the text was displayed before deletion.

Referring to FIG. 19(*b*), upon reception of a touch input F15 for selecting "earth" t1 from the list of deleted texts, the controller 180 can recover "earth" and display "earth" in a region b12 where "earth" was disposed before deleted.

Accordingly, a deleted text can be easily recovered before completion of the edition mode.

FIG. 20 illustrates an example of displaying a text letter by letter when the text is deleted.

Referring to FIG. 20(*a*), when a text is deleted by manipulating the object 7 in the text deletion mode, the object 7 can be dragged in one direction to delete a text included within a region in which the object is dragged.

Referring to FIG. 20(*b*), the controller 180 can display deleted letters in a box-shaped area 40 when the text is deleted letter by letter.

Provided that the word "space" is deleted letter by letter, when the object 7 is moved to the left from the letter "e" to delete the word "space", letters can be displayed in the order of "e", "c", . . . in the area 40.

Referring to FIG. 20(*c*), the controller 180 can display deleted letters in the area 40 in the order in which the letters are deleted and, when a set of displayed letters forms one word, display the letters in the correct order. For example, when a set of deleted letters displayed in the area 40 is "ecaps", the controller 180 can display the deleted letters as one word by arranging the letters as "space" in the correct order (FIG. 20(*d*)).

That is, the controller 180 can display a text deleted between sentences and indicate the position of the deleted text before completion of the text deletion mode. Accordingly, the deleted text can be easily recovered. In an embodiment, the controller 180 can return a deleted text to the original position thereof upon reception of a touch input applied to the text displayed in the area 40.

FIG. 21 illustrates an example of recovering a deleted text.

Referring to FIG. 21(*a*), when a sentence displayed in the text area 10 includes a deleted text, the controller 180 can display a predetermined indicator 2 at the position where the deleted text was disposed. That is, the controller 180 enables recovery of a deleted text by indicating a position at which the deleted text was disposed before completion of the text deletion mode.

Referring to FIGS. 21(*a*) and (*b*), the controller 180 can display a deleted text 3 instead of the indicator 2 upon reception of a touch input F17 applied to the indicator 2.

Referring to FIGS. 21(*b*) and (*c*), the controller 180 can recover the deleted text 3 upon reception of a touch input F18 applied to the deleted text 3. That is, the controller 180 can recover the word "space" and display the word "space" at a position where the word was disposed before deleted.

The above-described method of controlling the mobile terminal may be written as computer programs and may be implemented in digital microprocessors that execute the programs using a computer readable recording medium. The method of controlling the mobile terminal may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, optical data storage devices. The computer readable recording medium may also be distributed over network coupled computer systems so that the computer readable code is stored and executed in a distribution fashion.

A mobile terminal may include a first touch screen configured to display a first object, a second touch screen configured to display a second object, and a controller configured to receive a first touch input applied to the first object and to link the first object to a function corresponding to the second object when receiving a second touch input applied to the second object while the first touch input is maintained.

A method may be provided of controlling a mobile terminal that includes displaying a first object on the first touch screen, displaying a second object on the second touch screen, receiving a first touch input applied to the first object, and linking the first object to a function corresponding to the second object when a second touch input applied to the second object is received while the first touch input is maintained.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal, comprising:
   a touchscreen; and
   a controller configured to:
   receive a predetermined touch input applied to the touchscreen,
   display, on the touchscreen, a pointer for setting a reference point for deleting a text disposed around a touch point,
   display, on the touchscreen, a control area including a plurality of deletion items for setting a deletion direction and a deletion unit based on the pointer,
   receive an input for selecting one among the plurality of deletion items, and
   automatically delete the text based on at least one deletion item upon selection of the at least one deletion item.

2. The mobile terminal of claim 1, wherein the deletion direction includes at least one of the left and right of the pointer and the deletion unit includes at least one of a letter, a word and a sentence.

3. The mobile terminal of claim 1, wherein the controller displays an area in which a list of deleted texts is displayed on the touchscreen.

4. The mobile terminal of claim 3, wherein, upon reception of a touch input for selecting at least one text from the list of deleted texts, the controller recovers the selected text and displays the recovered text at a position where the selected text was disposed before deleted.

5. The mobile terminal of claim 1, wherein the controller displays an indicator at a position where the deleted text was disposed before deleted.

6. The mobile terminal of claim 5, wherein the controller displays the deleted text in place of the indicator upon reception of a touch input for selecting the indicator.

7. The mobile terminal of claim 6, wherein the controller displays the deleted text at a position where the deleted text was disposed before deleted upon reception of a touch input for selecting the deleted text displayed in place of the indicator.

8. The mobile terminal of claim 1, wherein the deletion direction and the deletion unit are measured relative to the pointer.

9. A mobile terminal, comprising:
   a touchscreen; and
   a controller configured to:
   receive a predetermined first touch input applied to the touchscreen,
   display, on the touchscreen, a pointer setting a reference point for deleting text disposed around a touch point,
   control the mobile terminal to enter a text deletion mode upon reception of a second touch input applied to the pointer,
   maintain the text deletion mode while the second touch input is maintained,
   display a range in which the drag input is applied as a block, upon reception of a drag input applied to the pointer, in the text deletion mode, and
   automatically delete a text included in the block upon cancellation of the drag input.

10. The mobile terminal of claim 9, wherein, in the text deletion mode, upon reception of the drag input applied to the pointer in a first direction the controller deletes a text included within a range in which the drag input is applied, and the controller displays the deleted text upon reception of a drag input in a second direction opposite to the first direction.

11. A method of controlling a mobile terminal, comprising:
   receiving a predetermined touch input applied to a touchscreen;
   displaying, on the touchscreen, a pointer for setting reference point for deleting a text disposed around a touch point;
   displaying, on the touchscreen, a control area including a plurality of deletion items for setting a deletion direction and a deletion unit based on the pointer;
   receiving an input for selecting one among the plurality of deletion items; and
   automatically deleting the text based on at least one deletion item upon selection of the at least one deletion item.

12. The method of claim 11, further comprising displaying an area in which a list of deleted texts is displayed on the touchscreen.

13. The method of claim 12, further comprising, upon reception of a touch input for selecting at least one text from the list of deleted texts, recovering the selected text and displaying the text at a position where the text was disposed before deleted.

* * * * *